(12) United States Patent
Levy

(10) Patent No.: US 6,241,893 B1
(45) Date of Patent: *Jun. 5, 2001

(54) WATER FILTRATION MEDIA, APPARATUS AND PROCESSES

(76) Inventor: Ehud Levy, 5933 Peachtree Industrial Blvd., Norcross, GA (US) 30092

(*) Notice: Subject to any disclaimer, the term of this patent is extended or adjusted under 35 U.S.C. 154(b) by 0 days.

This patent is subject to a terminal disclaimer.

(21) Appl. No.: 08/819,999

(22) Filed: Mar. 18, 1997

Related U.S. Application Data

(63) Continuation-in-part of application No. 08/599,925, filed on Feb. 12, 1996, now Pat. No. 5,616,243, which is a continuation-in-part of application No. 08/478,863, filed on Jun. 7, 1995, now Pat. No. 5,612,522, which is a continuation-in-part of application No. 08/261,998, filed on Jun. 17, 1994, now Pat. No. 5,538,746.

(51) Int. Cl.$^7$ ............................ B01D 37/00; B01D 15/00; C02F 1/28

(52) U.S. Cl. .................. 210/660; 210/683; 210/685; 210/688; 210/694; 210/774; 210/282; 210/283; 210/472; 210/502.1; 210/503; 210/908; 210/912; 204/157.44; 204/157.45; 204/157.5; 222/189.06; 252/315.5; 252/315.6; 422/21; 423/713; 423/716; 423/112; 423/118.1; 423/181; 423/203; 423/328.1; 423/330.1

(58) Field of Search .................. 204/157.4, 157.41, 204/157.44, 157.45, 157.5; 252/315.01, 315.5, 315.6; 210/282, 477, 291, 502.1, 472, 903, 473, 911, 474, 912, 500.25, 660, 683, 685, 688, 694, 774, 283, 503, 908, 664, 750; 222/189.06; 426/477, 590; 422/21; 423/713, 716, 111, 112, 118.1, 131, 179, 181, 203, 328.1, 330.1

(56) References Cited

U.S. PATENT DOCUMENTS

| | | | | |
|---|---|---|---|---|
| 4,263,266 | * | 4/1981 | Michel et al. .................. 423/328 |
| 4,496,528 | * | 1/1985 | Bourgogne et al. .................. 502/60 |
| 4,767,733 | * | 8/1988 | Chester et al. .................. 502/65 |
| 4,994,249 | * | 2/1991 | Verduijn .................. 423/328 |
| 4,995,975 | | 2/1991 | Jacquot et al. . |
| 5,236,680 | * | 8/1993 | Nakazawa et al. .................. 502/68 |
| 5,238,676 | * | 8/1993 | Roth et al. .................. 502/64 |
| 5,538,746 | * | 7/1996 | Levy .................. 210/664 |
| 5,612,522 | * | 3/1997 | Levy .................. 204/157.4 |
| 5,616,243 | * | 4/1997 | Levy .................. 210/282 |
| 5,681,475 | * | 10/1997 | Lamensdorf et al. .................. 210/666 |

* cited by examiner

Primary Examiner—Robert J. Popovics
(74) Attorney, Agent, or Firm—Penrose Lucas Albright

(57) ABSTRACT

An amorphous potassium aluminosilicate filtration media which may be mixed with activated carbon filters water to remove oxygen, chlorines, hardness, alkalinity, ammonia, hydrogen, hydrogen sulfide, sodium sulfite and other contaminants. The particular sodium aluminosilicate is a porous amorphous material formed under ultraviolet light or sunlight to produce pore sizes of 60 Å to 250 Å at ambient temperatures (20° C.–35° C.) and low relative humidity (5%–20%). The media is initially formed as a microporous primarily amorphous gel containing $Na_2O$, $Al_2O_3$, $SiO_2$ and $H_2O$. The sodium therein is displaced by potassium, whereby the filter removes impurities from water without introducing sodium. The potassium aluminosilicate may be a second stage filter to a first stage filter composed of a strong base anion media charged with potassium carbonate and/or bicarbonate. The filtration media may be used in any type gravity filter including that in an inverted bottle type dispenser for filtering water the flowing from the bottle to the spigot and also filtering air which bubbles back into the bottle in response to opening the spigot. The media as blended with activated carbon may be composed of molded particles having diameters from 1 to 100 microns and preferably 1–20 microns with an average diameter of about 10 microns. It also may be blended with zirconium oxide without carbon for reducing anion and cation species from drinking water.

87 Claims, 15 Drawing Sheets

WATER FILTRATION MEDIA, APPARATUS AND PROCESSES

RELATED APPLICATIONS

This is a continuation-in-part of application Ser. No. 08/599,925, filed Feb. 12, 1996, issuing as U.S. Pat. No. 5,616,243 of Apr. 1, 1997, which is a continuation-in-part of application Ser. No. 08/478,863, filed Jun. 7, 1995, issuing Mar. 18, 1997, as U.S. Pat. No. 5,612,522, which is a continuation-in-part of Ser. No. 08/261,998 filed Jun. 17, 1994, now U.S. Pat. No. 5,538,746, which issued Jul. 23, 1996.

FIELD OF THE INVENTION

The invention relates to filtration of water through a potassium aluminosilicate adsorption media, with or without being mixed with carbon, or combined with ion exchange media or both. More particularly, the invention relates to a method, apparatus, filtration media and process for making and using the potassium aluminosiicate media and combinations therewith, wherein water is filtered to remove alkalinity dissolved oxygen, hardness, sulfates, hydrogen sulfate, heavy metals, dissolved gases and other impurities from potable water and thus improve its quality.

BACKGROUND OF THE INVENTION

I

Chemistries of potable water differ considerably from place to place; important differences exist in the amounts of dissolved oxygen, hardness, as well as in a variety of other substances and gases dissolved in and carried by the water. Water may also include suspended material, such as clay particles, and bacteriological and biological contaminants. These impurities often adversely affect the many uses of water in society.

Dissolved gases, dissolved unwanted substances and suspended contaminants unfavorably affect the quality of drinking water. Hydrogen sulfide, sodium sulfite and ammonia, present in some regional drinking waters, even in minute amounts cause the water to have an unpleasant taste. Hardness, determined by the presence of calcium or magnesium carbonate or bicarbonate or combinations thereof, affects water's taste and appearance. Also, salts dissolved in water may tend to precipitate as a scum in hot beverages, such as coffee or tea. In addition, they affect the clarity of ice when such water is frozen. Further, dissolved gases, such as oxygen, are responsible for negative consequences relative to the appearance and taste of water, the taste of hot beverages, such as coffee, as well as the pellucidity of ice. These dissolved gases, substances and suspended contaminants thus constitute a continuing problem to those concerned with the taste and appearance of water, hot and cold beverages and ice.

Moreover, the problem is aggravated when the water is to be carbonated. The presence of dissolved gases, especially oxygen, and contaminants, particularly hardness, reduces water's capacity for carbonation. The result is that carbonated drinks are almost always less tasty because of reduced carbonation, and therefore less desirable to consumers.

Fountain beverage dispensers have been installed in bars, restaurants, drug stores and other locations on a worldwide basis which include apparatus for carbonating water received from a source of potable water, and mixing it with a flavored syrup to make a variety of soft drinks as well as alcoholic beverages. Although water may be treated at the point of use for removing or neutralizing contaminants in the local water supply, the various known and more frequently used modes of municipal water treatment seldom improve water sufficiently for optimum subsequent carbonation.

Also, it is not uncommon to provide an apparatus for softening water at the point of use. One method of softening water is to pass it through granular zeolite, which may be a natural occurring or artificially hydrated aluminum silicate, wherein the water softening action occurs due to the zeolite replacing calcium ions from the water with the zeolite's sodium ions. However, the addition of sodium to drinking water is deleterious for those with low-sodium dietary needs. Also, for the purposes of carbonation, sodium is considered undesirable as it, primarily from 20 ppm and up, destroys carbonation and thus should not be introduced into the water prior to carbonation.

Furthermore, dissolved gases, and other unwanted substances and suspended contaminants serve to impair the quality of water for other uses. For example, in the food packaging industry, water is often used as a medium in which to immerse the food to be packaged and preserved. The presence of gases, especially oxygen, many dissolved substances, as well as water's hardness, and suspended solids in the water medium have a pernicious effect on the preservation and taste of the packaged food. Also, the quality of water for domestic water heaters is an important concern in the industry; it is not unusual to place a water softener before a hot water heater to prevent calcification of the heat transfer surfaces in area of high water hardness. But this does little to remove dissolved gases that affect the efficiency of the heat transfer surfaces and the transfer of heat to and from the water. Additionally, the removal of oxygen and other contaminants from water added to boilers for "wet lay-up" has long been an industrial requirement.

There is therefore a need for a filter that can remove dissolved gases, other unwanted dissolved substances and suspended contaminants from common domestic water to improve its quality for a variety of purposes. The instant invention relates to a form of potassium aluminosilicate which has a chemical formula of particular types of zeolite and is produced in a manner similar to the production of certain types of zeolite. However, in its operable chemical and physical formulation, typical zeolite crystalline structures have not been detected by X-ray diffraction. Yet, because of its similarities to known zeolites both chemically and in the manufacture thereof, the instant invention is considered a zeolite.

In general, zeolites are molecular sieves that are unusually crystalline, hydrated aluminosilicates of monovalent or polyvalent bases which are able to adsorb and desorb water without changes to their crystal structure, and to adsorb elements and other compounds with the water removed. They are also capable of cation exchange.

Known zeolites are often formed by first a ripening or aging process for periods from several hours up to about nine days at ambient temperatures, that is, temperatures between 13° C. and 38° C. Following the ambient temperature or digestion step, the mixture is crystallized, which is accomplished generally at a temperature which may be the ambient temperature or one much higher. For example, crystallization may take place at temperatures from 20° C. to as high as 125° C. For commercial purposes, crystallization is usually effected at temperatures in the range of about 80° C. to 125° C. Not only is it more rapid, but also at lower temperatures the resulting crystals are often smaller in size than those formed at a higher temperature.

The chemical formula for a zeolite known as zeolite Y, expressed in terms of moles of oxides, may be written as: $0.9\pm0.2\ Na_2O:Al_2O_3:wSiO_2:xH_2O$, wherein w is a value greater than about three up to about six, and x may be a value up to about nine. Such zeolite is disclosed along with a number of examples in U.S. Pat. No. 3,130,007, of D. Breck, which issued Apr. 21, 1964. Although, this zeolite Y is asserted to be a particularly effective adsorbent of oxygen, my attempts to use zeolite Y, as such, to achieve an effective removal of oxygen from water have been unsuccessful.

II

Inverted bottle type water dispensers, commonly known as "water-coolers" or "water-stands," are often found in American homes and workplaces. They provide a source of pure drinking water in areas where the hygienic quality or the esthetic taste of the domestic water may be less than desirable. They also provide a convenient way of cooling or heating water or both before it is dispensed. These water-stands normally require the purified drinking water to be supplied from a source outside the home or workplace, such as the delivery of the bottled water from a supplier of bottled pure water or purchasing purified water from a vending machine.

These options can be expensive and/or inconvenient for the consumer. An attractive option for consumers is to fill the bottle directly from a household tap, filtering the water with a gravity filter at the water-stand to provide a source of purified water suitable for drinking. This option provides a source of purified drinking water segregated from the tap water; tap water can then be used advantageously in applications where taste is of no concern, such as cleaning.

However, from time to time, the water-stand's filter needs to be replaced or disinfected due to the growth of microorganisms inside the filter. Thus, the filter should be easily installed, removed and disinfected and it is preferable that the consumer can install, remove and disinfect it himself or herself with relative ease. Further, it may be preferable, from the consumer's standpoint, that the periods between disinfecting be reasonably long.

One method of extending the period between filter cleaning is to fashion the filter so that the flow of water through the filter flushes all the water previously standing in the filter and to allow convection currents to flow between the filter and reservoir. Also, if the water is heated or cooled in the reservoir, since this heating or cooling retards the growth of microorganisms, a filter which is substantially immersed in this water has its microbiological growth hindered.

It is also advantageous to the consumer that the filter be relatively inexpensive and universally adaptable to most conventional inverted bottle type water dispensers. Further, in view of water shortages being experienced in certain sections of the country, the design of the filter should provide, insofar as practical, that all the system's water be filtered and used.

Moreover, if heating or cooling systems are utilized in the water-stand, scale accumulates on the heating or cooling elements when hard water is heated or cooled, reducing the element's efficiency. Hardness also imparts an unpleasant taste to the water, especially when it is used in making coffee or tea and hardness interferes with the clarity of ice if the hard water is frozen. Thus, a superior filter used in a water-stand should soften the water as well as reduce harmful bacteria growth and remove or reduce other detrimental solutes.

Lead, zinc, copper, calcium, calcium bicarbonate, ammonia, sodium sulfite and hydrogen sulfide are examples of other detrimental solutes commonly found in tap water in the United States. Each, in sufficient quantities, is harmful if ingested or provides an unpleasant flavor to water. Accordingly, a filter, used to purify tap water in a waterstand, should remove these substances as well. Tap water in most areas of the country contains chlorines. Chlorines impart to water an unpleasant taste, especially when that water is subsequently used to make coffee. Consequently, in a system which filters tap water in an inverted bottle type water dispenser to supply purified water, chlorines should be removed as well.

Adding to the burden of prerequisites for a satisfactory filter for use in a conventional inverted bottle type water dispenser is the requirement that the filter does not significantly hinder the flow-rate of water into the reservoir from the bottle. For example, an average water cooler has a reservoir capacity of four thousand cubic centimeters. In an office of twenty-seven people with each drawing a five-ounce cup of water at a rate of ten seconds per person, this reservoir could potentially be drained in about four and one-half minutes. Therefore, it is necessary that the filter's flow-rate to the reservoir exceed this demand.

There are many devices and methods for filtering water in an inverted bottle type water dispenser which have been disclosed in the prior art. None, to the inventor's knowledge, provides a fully satisfactory means of meeting the aforementioned requirements. The following briefly describes a few of these devices and how they requite the imperatives indicated above.

Frank Senyal discloses an apparatus for filtering water in his U.S. Patent entitled, "Filter and Water Purifier" which issued Nov. 30, 1943 as U.S. Pat. No. 2,335,458. Here, Mr. Senyal provides a filter for a water cooler comprised of two receptacles connected in a nested, superposed relation. The first receptacle receives the neck and mouth of the inverted bottle (which is fitted with a feed tube/stopper arrangement) and utilizes a valve to direct the water flowing from a receiver to a first filter sandwiched between two screens. The water is then drained via a tube to the bottom of a second receptacle which provides for an upward flow of the water through a second filter, thereupon to discharge into the water cooler's reservoir. The filter arrangement depends into the reservoir of the water cooler by an outwardly extending flange resting on the recess of the reservoir.

Mr. Senyal discloses a further water purifier for a water cooler in U.S. Pat. No. 2,372,340, issued Mar. 27, 1945 and also entitled, "Filter and Water Purifier." In this disclosure, a strainer is attached to the feed tube/stopper arrangement and water is directed to flow from this strainer to a receiver. The receiver depends into the reservoir of the water cooler and is attached to the water cooler by means of screws. Via a valve, water drains from the receiver to a filter element which provides an upward flow of the water through the filter to discharge into the reservoir. The filter element is supported on the base of the reservoir and fits, sleeve-like, over the receiver.

Both these filter arrangements have disadvantages. For example, in the former patent, Senyal discloses a unified two filter arrangement which is awkward, at best, for the consumer to install or replace. In the latter patent, the filter arrangement comprises several distinct and unconnected parts which provide unwelcome complexity to the consumer. Moreover, because in both patents the bottom section is disclosed to drain the water from its top, water below the discharge ports will be retained, with the consequence that removing the bottom section from the reservoir requires undue effort on the part of the consumer and, further that this section be drained before disinfecting. Still further, Senyal teaches in both patents that the water below the ports is moved into the reservoir by the preceding water. Therefore when there is no longer any preceding water (i.e.—the bottle is empty), the water below the ports within the filter is substantially lost for drinking. Additionally, Senyal's relatively convoluted flow-path of water—from the bottle to a cylindrical receiver (via a strainer in the second patent), then through a valve aperture offset to a side of the bottom of the cylindrical receiver, next through a first stage filter (in the first patent), down a tube to the bottom of a second stage filter and up through the second stage filter to a discharge port on top—which is inconsistent with and unappreciative of the need to provide complete flushing of the filter and to permit the occurrence of convectional currents between the filter and the reservoir. Yet further, all the water in Senyal's receiver is not necessarily flushed out by the entry of more water from the bottle, especially if there are irregularities or indentations in the sides or bottom of the cylindrical receiver.

U.S. Pat. No. 4,145,291 which issued Mar. 20, 1979 to Console et al., entitled "Disinfecting Means Within a Water Dispenser," discloses a conical basket supported by a flange interposed between the lower end of an inverted bottle and the upper end of the container of the water dispenser. The basket is disposed inside a reservoir of the water dispenser, directly below the mouth of the inverted bottle, and contains a vented, porous capsule containing silver for the inhibition of the growth of bacteria and other microorganisms in the water.

Console et al. do not otherwise address filtering the water for particulates or other harmful solutes and, in fact, provide a vent which would allow particulates or other harmful solutes to be introduced into the reservoir. Further, although silver ions are known to have a disinfecting effect in water, silver can be relatively expensive and its presence in drinking water is not desirable.

Carl Frahm discloses in U.S. Pat. No. 4,181,243, which issued on Jan. 1, 1980 entitled "Device for Filtering Beverages," a filter element provided at the inlet of a spigot for dispensing liquids from a reservoir.

As shown, Frahm's filter assembly requires the draining of the reservoir for its installation, removal or cleaning and is, therefore, relatively inconvenient and wasteful.

"Bottle and Filter" (U.S. Pat. No. 5,139,666, issued Aug. 18, 1992 to Charbonneau at al.) discloses an unusual inverted bottle which is refilled via a refill neck with a counter-cap that records the number of times the bottle is refilled. A filter is retained inside a discharge neck. The filter element is attached to the bottle via a screw-on cap and held in place by projections integral with the bottle. An air vent is provided near the filter element on the cap.

Charbonneau at al.'s invention requires a water bottle of an unusual design and a relatively complex attachment of the filter element to the bottle. Further, several pockets of water are likely to collect in the bottle which would be difficult to retrieve.

Heinrich Niewig discloses in U.S. Pat. No. 5,238,559, entitled "Filter Device," that issued Aug. 24, 1993, a filter device similar to that disclosed by Charbonneau et al. Unlike Charbonneau et al., Niewig provides a vent at the "refill" neck. Niewig's disclosure again requires a water bottle of unusual design and a relatively complex attachment of the filter element to the bottle very similar to Charbonneau et al.'s teachings on these points and thus Niewig shares Charbonneau at al.'s disadvantages.

In U.S. Pat. No. 5,441,179, titled "Ultra-Violet Disinfecting Device Adapted for Use with Bottled Water Dispenser" and issued on Aug. 15, 1995, Stephen Marsh discloses using ultraviolet light to eliminate biological growth in the reservoir of a water cooler.

Marsh provides an example of the art's increasing complexity and expense, without suggesting how other harmful contaminants in the water should be removed.

Disclosed in U.S. Pat. No. 5,486,285 by Brian Feeney, "Air Inlet Valve for Water Cooler" (issued Jan. 23, 1996), is a filter system removably connected to the neck of a bottle of a water cooler and forming a watertight seal therewith. This system comprises a one-way valve for admitting air into the bottle and a sleeve for receiving a replaceable water filter.

Feeney's design is also relatively complex. It also requires a threaded neck on the bottle to fit the threads of its filter system and is therefore specific to bottles with a threaded neck, not unlike Charbonneau at al. and Niewig.

From the foregoing, it may be appreciated that there is a need for a water filter for an inverted bottle type water dispenser which is easily installed and removed, of relatively simple and inexpensive design, easily cleaned and disinfected, unwasteful of water, adaptable to most bottles used for inverted bottle type water dispensers, and with the dispensers as such, and which filters from the water dissolved oxygen and other dissolved gases and impurities such as lead to improve the taste and healthfulness of the water as well as softening the water, improving its taste and preventing scaling of heating or cooling coils in the dispenser.

III

Water filtration was long viewed as merely a mechanical process of straining out the solid particles whereby a turbid water is clarified. As a filtration agent, it has been long appreciated that charcoal not only clarifies potable water, but also has the power, to some extent, to soften hard water and remove other organic material. Activated carbon or charcoal is frequently used for water purification, such carbon being "activated" by heating it to 800° C.–900° C. with steam or carbon dioxide which creates a porous internal structure (honeycomb-like) that averages about 1,000 square meters per gram.

"Zeo-Karb", a high-capacity carbonaceaus zeolite marketed by Permutit Co., is manufactured from coal, lignite or wood, by treatment with oleum, chlorsulfonic acid or other agents. It can function in the sodium zeolite cycle, taking up calcium and magnesium from the water and exchanging it with sodium. Its revivification is by treatment with a salt solution. It may also function in the hydrogen zeolite cycle in which metal ions, calcium, magnesium and sodium leave the water to be replaced by hydrogen ions. In such case, the rivivification is by a dilute acid treatment.

In U.S. Pat. No. 4,238,334, of Dec. 9, 1980, C. Halbfoster teaches that it is well known that activated carbon particles may be used to extract a broad range of components from liquids. He also teaches that in the case of activated carbon, it is desirable to have a very small particle size in order to maxinize the surface area. Thus, particles as small as one micron average particle size may be employed for effective filtration of liquids. However, the use of filter elements having only activated carbon resulted in high pressure drops which demonstrated that activated carbon alone could not be used, wherein the activated carbon was finally divided having an average particle diameter of less than 20 microns. C. Halbfoster teaches that activated carbon as well as other active particulate should be mixed with a fibrous filter aid material. Filters using finely divided activated carbon were found by C. Halbfoster to be highly effective in removing chlorine from aqueous solution.

R. Moses discloses a method and apparatus for softening and filtering well water in U.S. Pat. No. 4,305,826, of Dec. 15, 1981. He points out that the ion exchange media, zeolite, which was used for many years for softening water in homes and industry has been largely superseded by organic cation exchange resins. Nevertheless, he combines zeolites, albeit not mixing same, with activated carbon as advantageous to filter well water. He uses a very porous activated carbon which adsorbs primarily organic compounds and gases including chlorophenols and chlorine. The granules of zeolite, because of their irregular shapes, pack together lightly and filter out substantially all particles in the water having a size greater than 20 microns.

U.S. Pat. No. 5,554,288, of Sep. 10, 1996, of Rydell et al, discloses disposable paper filters to be used for removing contaminants from drinking water. Rydell et al teach a composite paper filter ply comprising about 1% to 20% by weight of granular activated carbon for removing halogen and organic contaminants, between about 1% and 20% of a metal removable additive selected from a group which includes aluminosilicate zeolites, and between about 98% and about 60% by weight of a pulp such as unbleached Kraft pulp. Rydell et al point out that in the prior art, only coarse particulates could be used because finer particulars cement themselves together upon contact with water and cause the bed of particulates to loose permeability. The Rydell et al filters are used only once and disposed of before there is any possibility of saturation with contaminants or with growth of bacteria. Rydell et al conclude that activated carbon is an effective adsorbent for removal of organic contaminants and it also facilitates removal of some metal cations, including lead. Rydell et al report that NSF Drinking Water Standard 53-1992 for lead can be met using a filter incorporating aluminosilicate zeolites available in various salt forms, such as potassium salt zeolite Valfor G102® manufactured by Valfor Corporation of Valley Forge, Pa. However, Rydell et al considered certain naturally occurring clays as preferable.

Where a filter is being used in conjunction with an inverted bottle type dispenser in the manner of the instant invention, not only is the water filtered as it flows from the bottle, into the underlying reservoir and finally through the connected spigot to the user, the air which displaces the water in the bottle is also filtered in its path of being vented from the reservoir through the filter and into the inverted bottle. Thus the invention relates to a gravity filter media generally 25 cc to 500 cc utilized both for filtering drinking water and for filtering air which bubbles into and through the inverted water bottle. In this connection, porous media to separate gases, liquid droplets and/or solid particles from gases or vapors is disclosed in U.S. Pat. No. 4,239,516, of Dec. 16, 1980, to Klein. This patent teaches gas-vapor adsorption filtering or treating mats that include glass fibers, micro-bits and organic binding agent together with finely divided activated carbon and finely divided molecular sieve particles, plus a sufficient amount of cobeat to restrain the carbon or the molecular sieve particles against "dusting off." The activated carbon can be provided, in addition to the primary constituents, up to a maximum of about 50% of the overall content. The molecular sieve particles can be provided to an extent of about 75%. Polyester fibers can be provided and arranged from about 2% to about 7.5%, and the cobeat from about 2% to about 30%. The finely divided activated carbon and the molecular sieve particles can be admixed. The zeolite molecular sieve powder particles have a nominal pore diameter of about 5 Angstroms.

S. Frazier teaches in U.S. Pat. No. 4,534,775, of Aug. 13, 1985, an air treatment filter media which may be a combination of zeolite and activated carbon. He states that the adsorbent material may comprise an intimate mixture of the zeolite and activated carbon, or the zeolite and activated carbon may be distributed in two or more adjacent layers. Zeolite X is preferred and, more specifically, 13-X zeolite which is commercially available from the Linde Division of Union Carbide Corporation.

S. Frazier further teaches in U.S. Pat. No. 4,604,110, of Aug. 5, 1986, a filter element for removing odors from indoor air which is a mixture of silica gel activated carbon and a zeolite. Again, the preferred zeolite is 13-X. The patent states that activated carbon is an amorphous form of carbon characterized by high adsorptivity for many gases, vapors and colloidal solids. It is considered specifically effective against non-polar compounds, and general organic compounds. Molecular sieves, having a relative small pore size, were considered effective against compounds such as hydrogen sulfide, alcohols, esters and aldehydes. Silica gel, which has larger pores in comparison to molecular sieves and activated carbon, was considered quite effective for long carbon chain compounds and specifically organic acids. The patent states that the removal capacity obtained by combining the three ingredients was better than the sum of the individual components. The mesh size of each component was not considered particularly critical, although it was considered preferable to have particle rather than powder formulations to provide lower resistance to air flow. It is stated that the zeolite particles were spherical in shape, whereas the silica gel and activated carbon particles were essentially in chunk form (i.e., non-spherical or irregular shapes). The combination of the chunk particles and the spherical particles thus nestled together and completely filled the volume of the filter, keeping voids or open spaces to a minimum.

From the foregoing, it will be appreciated that the mixture of activated carbon and molecular sieve zeolites as filtration media for both water and air is known, and it is also recognized that the different shapes of the carbon and zeolite particles may cooperate to increase the permeability of the media as well as its effectiveness in removing various airborn or waterborn contaminants. The prior art does not, however, teach the admixture of activated carbon and amorphous zeolite material in accordance with the instant invention irrespective of particle size, and this is particularly so for an amorphous zeolite having pores in the range of about 60 to 250 Angstroms diameter.

SUMMARY OF THE INVENTION

I

I have discovered that certain potassium aluminosilicate gels, in particular, unique gels of amorphous formations, when used to filter water effectively remove dissolved oxygen and other gases and chemicals such as ammonia dissolved in water so that its taste and appearance, from water coolers, ice machines or hot beverage makers, and its carbonation, which have been heretofore adversely affected by the quality of the drinking water without such filtration, are markedly improved.

Dissolved oxygen is not an ionic species in water solution. However, it has a pair of unbonded electrons that make it a very electronegative species. It is capable of undergoing sorption/desorption mechanisms based on dipole—dipole interaction with electropositive species such as potassium aluminosilicate or potassium titanium aluminosilicate. The hypothesized interaction between dissolved oxygen and a metal halide on aluminosilicate surfaces would be one which the halide is displaced by oxygen.

An aluminosilicate gel which has been used successfully for this process is made from 21% by weight of alumina hydrate type pseudoboehmite $Al(OH)_3$ and 68% to 72% sodium silicate $Na_2O.3.22–2.88\ SiO_2$, which are mixed with 11% to 14% by weight, sodium hydroxide NaOH in a 5% concentration, and blended into a slurry. The slurry is filtered, washed with clean water, permitted to gel, heated with steam to initiate formation of the spongy, porous amorphous structure, and laid over a flat bed wherein the hydrogel is formed under ultraviolet radiation (wave lengths of 2000 Å–3900 Å) at ambient temperature (20° C.–39° C.) in a low relative humidity (5%–20%) for two to ten weeks with about sixty days being typical. As a practical matter, the heat generated in this step tends to maintain the effective relative humidity in the desired range. Heat and ultraviolet radiation make the large particles intergrow to vermicular particles forming microporous spongy, porous structures which allow water to get in and out very fast and perform ion exchange in the structure of the gel.

The alumina hydrate which is used has particle sizes of about five microns for about 75% of the material, and five to ten microns for about 100% of the material. Dispersed alumina can also be used.

Although after the gel has commenced to form, ultraviolet radiation is no longer necessary and the formation of the spongy microporous amorphous structure can be completed without further subjecting the substance to such radiation, it is preferred that the radiation be continued until formation of the spongy, porous amorphous structure of the zeolite gel is complete—at least to having the desired pore sizes. Preferably, intense ultraviolet radiation is provided by ultraviolet lamps.

If the presence of sodium is undesirable, when the formation of the spongy, porous amorphous structure of the gel is complete, the gel may be washed with pure water and placed in a bath of a potassium salt, preferably potassium carbonate or, for example, potassium chloride, wherein the potassium displaces sodium in the zeolite gel.

The resulting potassium aluminosilicate is thoroughly washed with deionized (DI) water, dried and screened to produce a particle size of 8 to 60 mesh, preferably 24×40 mesh, which is packed in polyglass cylinders or cartridges, having a total volume of about forty cubic inches to about five thousand cubic inches, (cartridges of two inches inside-diameter and one foot inside-length to twelve inches inside-diameter and four feet inside-length). The resulting gel is translucent in water, but in its dry form is an opaque white, hard material similar in appearance to talc.

The cartridges are mounted in the plumbing that carries the water preferably immediately before the heating, cooling, freezing or carbonation apparatus of a hot beverage maker, water cooler, ice-maker or fountain dispensing machine, respectively.

If the potassium aluminosilicate product is not heated or packed too tightly, it retains surprising large pore diameters and pore volumes as well as a large effective internal surface areas. It has been ascertained that the first ten thousand gallons of water filtered through the zeolite gel of the invention had its dissolved oxygen largely, and in fact virtually entirely, removed, and the carbonation process of the apparatus was substantially improved, whereby carbonated water and beverages dispensed therefrom were equal to or better than beverages from comparable fountain dispensing machinery in areas wherein adequate carbonation of the water supply has not been considered a problem.

A cartridge of one foot inside-diameter and forty inches inside-length filled with a filtration media of potassium aluminosilicate in accordance with the invention, after filtering ten thousand gallons of water, continues to remove dissolved oxygen. But after a further fifteen thousand gallons of water have been filtered, the filter's effectiveness decreases, albeit it continues to remove up to 50% of the oxygen in the water.

In some parts of the country, the water contains high levels of sulfides, sulfates and/or sulfites which affect the carbonation and taste of soft drinks. I have discovered that the combination of a strong base anion, in the form of a first stage filter, with the potassium aluminosilicate, discussed hereinabove and in the form of a second stage filter, can produce triple the carbonation than otherwise produced without either filter. The strong base anion resin used was activated with potassium carbonate or potassium bicarbonate.

The strong base anion, which constitutes the first stage filter in this instance, is charged while substitution of sodium for potassium takes place within the potassium aluminosilicate filter, the second stage filter. The carbonate or bicarbonate is preferentially disassociated from potassium and attracted to the strong base anion while the resulting free potassium preferentially replaces sodium acquired by the filtration process in the potassium aluminosilicate.

Water, with a high sulphur content, which passes through the first stage filter, has the sulphur removed by ion exchange with the carbonates or bicarbonates within the strong base anion.

Many soft drinks formed by carbonation, either in the carbonator or as dispensed, such as Coca-Cola brand Coke®, have pH levels in the acidic range of around 2.5. This acidity tends to break down carbonates and bicarbonates in solution into $CO_2$. Thus, water, having carbonates or bicarbonates added thereto by sulfates reacting with the first stage filter or wherein the hardness is reduced by removal of the calcium or magnesium from carbonates or bicarbonates, displays the surprising benefit of increased carbonation when an acidic syrup is mixed therein.

Tests conducted in a high concentration of sulfate, chloride and total dissolved solids, (TDS), demonstrate that filtration units of one cubic foot of strong base anion resin placed ahead of potassium aluminosilicate increases $CO_2$ and decreases the level of sulfates for a minimum flow therethrough of one thousand gallons of influent.

The capacity of the potassium aluminosilicate filtration media in accordance with the invention for oxygen removal is between fifteen and forty-five ounces of oxygen per cubic foot of the filtration media. At the same time, the filter removes virtually all ammonia ions in the water. If hydrogen sulfide is present, it is also removed. Further reduction was found in the levels of calcium bicarbonate, calcium, sodium sulfite, hydrogen, copper, lead and zinc, when present.

In Miami, Fla., bitterness of municipal water was eliminated.

These results relating to the filtration of water by potassium aluminosilicate are truly unexpected and astounding and suggest that my invention has utility far beyond the improvements of carbonation, ice, hot beverages or cooled water and beverages. The novel and improved results provided by the invention, including the filtering process, the apparatus, and method of making the potassium aluminosilicate for use in the process, as such, and its combination in the filtering process with a strong base anion filtration media charged with carbonate, are the primary objects of the invention.

II

For using the filtration media discussed above for filtering drinking water, I have invented a new and useful filter system and method of filtering for inverted bottle type dispensers. The filter basket depends from the collar or shoulder of the water dispenser into the water reservoir and is easy to install and remove. The basket has a conicalshaped receiver which receives the neck and mouth of the inverted water bottle and directs the flow of water therefrom to a filter receptacle. The filter receptacle contains a filter media which filters from the water oxygen, lead, zinc, copper, calcium, calcium bicarbonate, ammonia, sodium sulfite and hydrogen sulfide and softens the water. The filter media preferably also removes chlorines and chloramines.

The filter media remains submerged in the water most of the time which advantageously aids the filtering capacity and retards microorganism growth in the filter media when the water is chilled or heated.

The invention is relatively lightweight and manageable in size. The filter basket is composed entirely of a microwave safe material, such as polypropylene, that also withstands the heat of boiling water. For most installations in homes and offices, a microwave oven will be available near the location of the dispenser. Due to this circumstance, the filter can be routinely disinfected each time the bottle is filled with water while at the same time the adsorbents in the filtration media are reactivated. Thus, disinfecting and cleaning of the filter basket is a relatively simple operation which can be accomplished, quickly and easily, in nearly all homes and offices by consumers.

It has been found advantageous to form potassium aluminosilicate so that the particle size is in a range of 1 to 100 microns diameters and preferably 1 to 50 microns diameter. Approximately 7% to 8% by weight of a binder is mixed with the potassium aluminosilicate. Any suitable binder can be used such as a polyethylene, wax or nylon binder. The media is compressed into a cylinder and molded therefrom at a pressure of between 60 and 100 psi, depending upon the size of the filtration block to be produced, for a duration from about 15 minutes up to as much as twenty-four hours at a temperature of 250° F.–340° F. The molded particles have selected diameters, typically in the ranges of ten to fifty microns. The filter block can be produced by blending the media and binder with activated carbon of between 15% and 50% by weight of the filter block. The activated carbon is initially primarily in a particle size in the range of 1 to 100 microns diameters, and preferably substantially in the 1 to 50 micron range. The blend is molded whereby the particles have selected diameters which again are typically in the ten to fifty micron range. The activated carbon contributes primarily to the filtration of organic substances from the water and to improve its taste or at least avoid an undesirable taste in the drinking water. The potassium aluminosilicate media in an effective and amazing manner eliminates or reduces chlorides and sulfates from the water. The reduction of chlorides compares with that produced by a mix of deionized resin or through reverse osmosis but at much less cost. In general, the smaller in microns of the diameters of the extruded particles, for both potassium aluminosilicate, per se, and when blended with carbon, the better is the performance of the filtration media insofar as its filtration capacity is concerned. Because of this, I attempt to obtain a range wherein the particle size average is about ten microns in diameter. However, as a practical matter, to avoid undue pressure drop across the filter, a mixture of particles of up to about 20 micron diameters are utilized.

It is my hypothesis that the small particle size creates a relatively large surface area that is attractive to ions at 3 Angstrom diameter much faster (10 to 50 times) than organic resins. It has been found that the combination of 1–50 micron diameters of potassium aluminosilicate particles with 10–100 micron diameters of activated carbon, mixed together as a filtration media, the potassium aluminosilicate being amorphous, provides channels for the rapid passage of water with a very high kinetic. The high capacity media removes carbonates, heavy metals and dissolved oxygen on an order of magnitude greater than known organic resins which serve the same purpose.

DETAILED DESCRIPTION OF THE PREFERRED EMBODIMENTS

Figure 1:
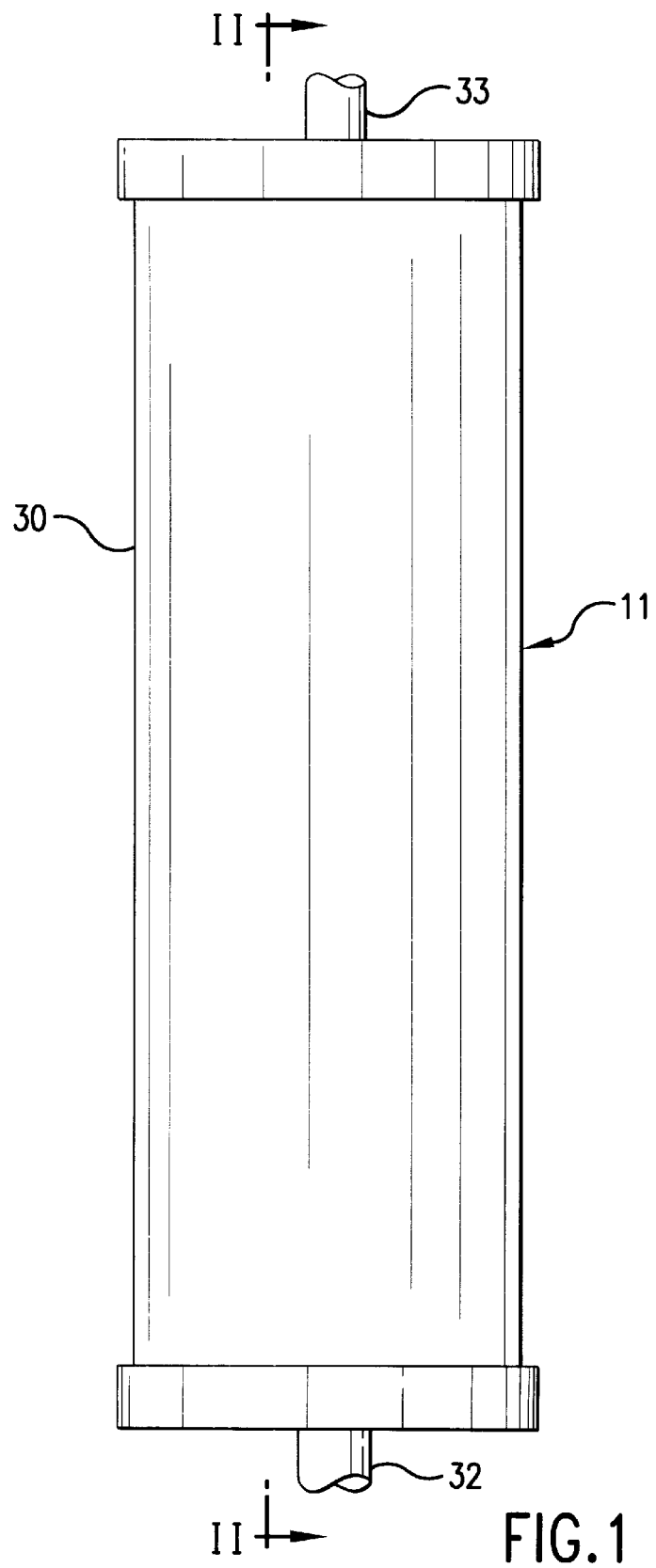
FIG. 1 is an elevational side view of the filter of the present invention.
Figure 2:
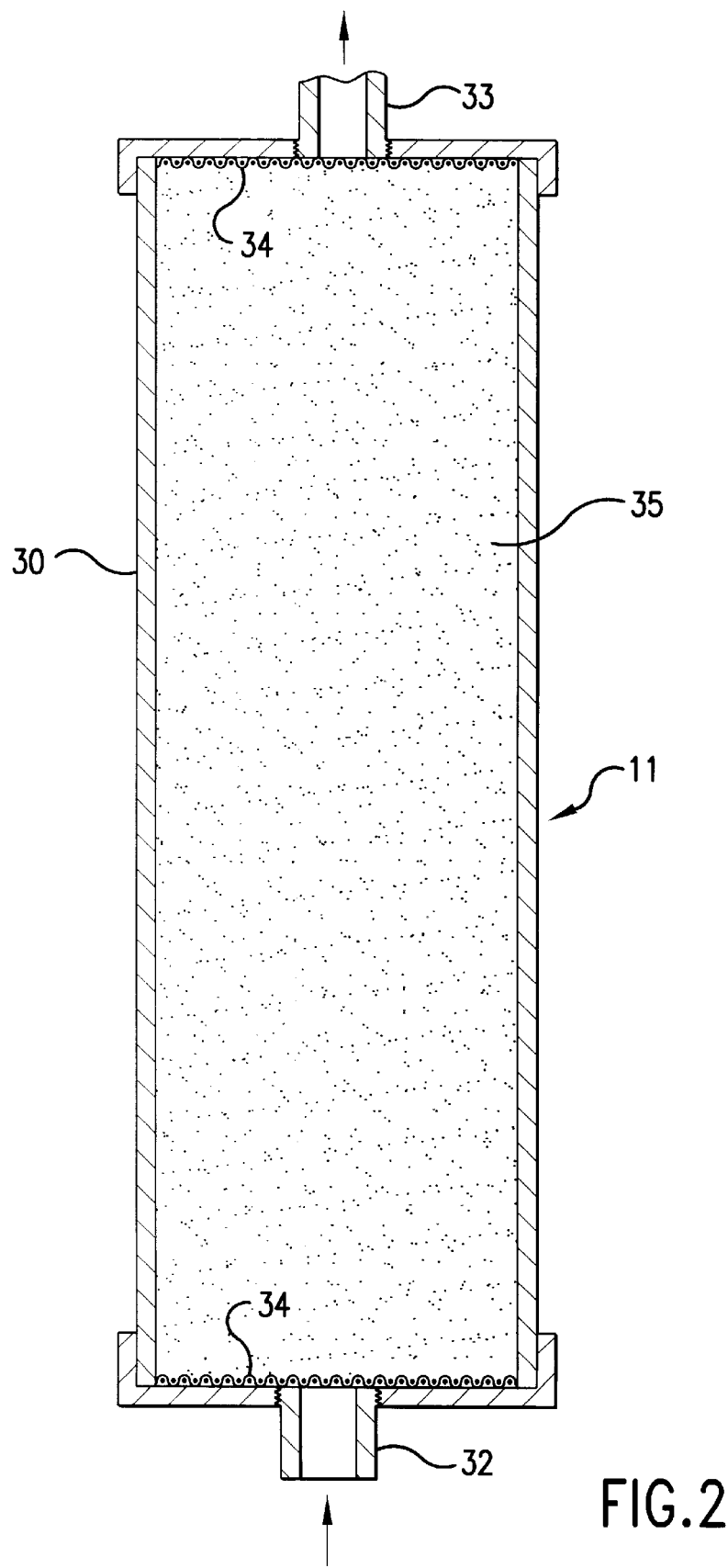
FIG. 2 is a sectional view of the filter shown in FIG. 1 taken along section lines II—II of that Figure.

Referring to FIGS. 1–4, filter canister 11, is comprised of at least one canister 11, and zeolite gel media 35, contained therein.

Canister 11, as depicted in the Figures, is intended broadly to represent any filter cartridge known in the industry that can be adequately pressurized, is hygenically acceptable, and has sufficient capacity to contain the desired quantity of zeolite media 35, (and, if desired, a sufficient quantity of anion media 36 or a blended zeolite gel and carbon media), has at least one inlet port 32 and one outlet port 33, both to be connected via water-tight coupling to water pipes, and to provide a flow-path for water from inlet port 32 through media 35, (and, if desired, through the anion media 36 or a mixed zeolite gel media and carbon media) to outlet port 33.

Fifty micron screens 34 are provided at inlet 32 and outlet 33 ports to prevent media 35 (and, if desired, anion media 36 and between media 35 and media 36 to prevent media 35 from mixing with media 36, eight micron screens being provided for media having a minimum often micron diameter particles) from flowing out of canister 11. Of course, other methods and screen sizes, as will occur to those skilled in the art, to prevent media 35 (and, if desired, anion media 36) from flowing out of canister 11, (or mixing), and which also allow an acceptable flow-rate of water therethrough, can be substituted.

The volume of filter 11 is typically in a range of about fifty cubic inches to two and one-half cubic feet of zeolite gel 35 produced in accordance with the invention. Two and one-half cubic feet of filtration media 35, placed in polyglass cylinders or cartridges 11 of types well known to the trade (or several cartridges 11 disposed in parallel), is capable of treating 10,000 gallons or more of water. In a typical system, influent water was found to have from 5.6 mg/L to 6.2 mg/L dissolved oxygen. Effluent water from filter 11, however, contains virtually no measurable amount of dissolved oxygen after 10,000 gallons at a flow rate of three gallons per minute.

The volume selected for filter 11 depends upon the local water conditions, the flow rate and the quantity desired, and how often it is convenient to change filter 11. For most installations, cartridges 11 containing 2000 cubic inches of filter media 35 are adequate and are replaced after periods of time varying from a few months to a year. But for soft drink plants, filter media 35 may be held by stainless steel or glass-lined tanks, rather than cartridges, wherein filter material 35, as such, is periodically replenished. The capacity of such tanks is normally in the range of twenty-five to five hundred cubic feet.

Figure 4:
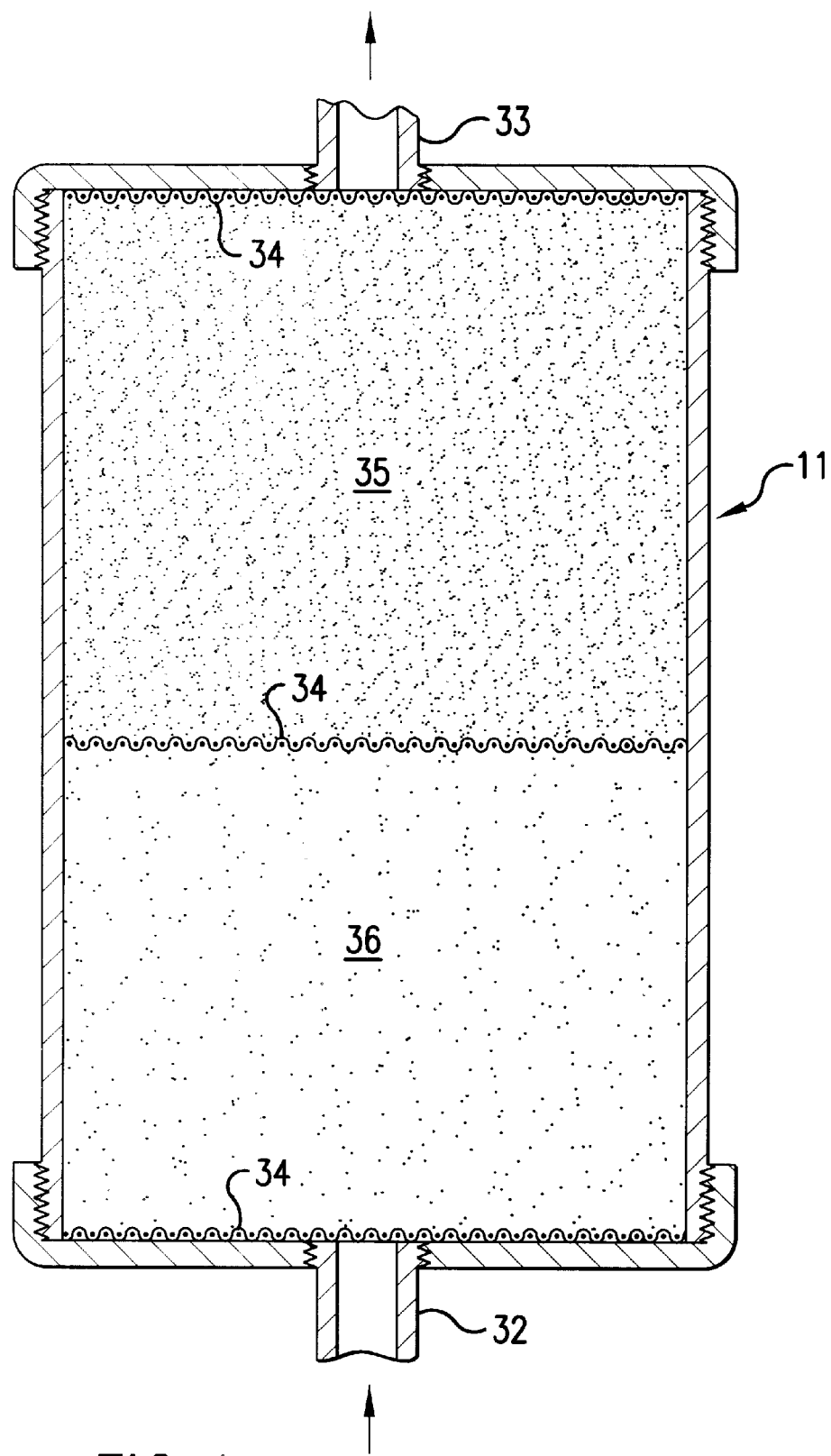
FIG. 4 is a sectional view of the filter shown in FIG. 3 taken along section lines IV—IV of that Figure.

Referring now to FIG. 4, strong base anion media 36 may be advantageously provided as a first stage filter in series before zeolite gel 35, (which is now a second stage filter), in areas wherein the municipal domestic water contains large amount of sulfides, sulfates and/or sulfites. Small amounts of these sulfur-related ions give drinking water an unpleasant taste. This is particularly so wherein the drinking water is mixed with an acidic soft drink syrup, such as Coca-Cola brand Coke®. Tests have shown that 200 ppm of sulfate in the water used for a Coca-Cola beverage imparts an adverse taste to the soft drink.

A strong base resin 36 is placed in cartridge 11, which is of a size to accommodate both resin 36 and gel 35. The zeolite gel 35 is disposed in cartridge 11 so that water entering cartridge 11 must first pass through resin 36 before entering gel 35. Resin 36 is separated from gel 35 by 50 micron partition 34.

Of course, other methods and apparatus known to those skilled in the art for corining resin 36 and gel 35 may be substituted. For example, filter 11 may comprise two cartridges 11 placed in series, (with screens 34 at their respective ports), the first containing resin 36 and the second containing gel 35.

The volume required for strong base resin 36 is essentially the same as that required for zeolite gel 35. Hence, under normal circumstances, the volume of filter 11, for receiving a sufficient amount of both zeolite gel 35 and strong base anion 36 is essentially twice that when zeolite gel 35 is used alone.

Figure 5:
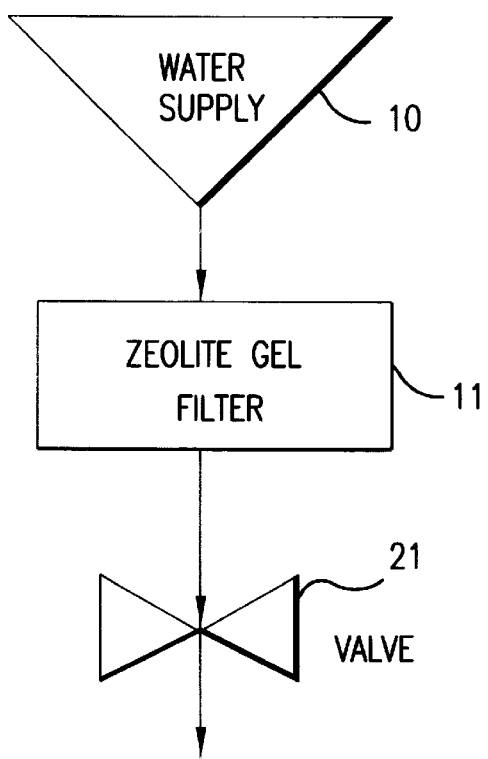
FIG. 5 is a schematic representation of a potable water system utilizing a potassium aluminosilicate filter in accordance with the invention for removing dissolved oxygen and other dissolved and suspended gases and substances from the water supply prior to use.

FIG. 5 illustrates the advantageous use of filter 11 in conjunction with potable water supply 10. Potable water received from water supply 10, which may be any appropriate source of potable water, passes through filter 11 for removal of dissolved and suspended gases, including oxygen, and other contaminants for purifying and softening water issuing from valve 21.

Figure 6:
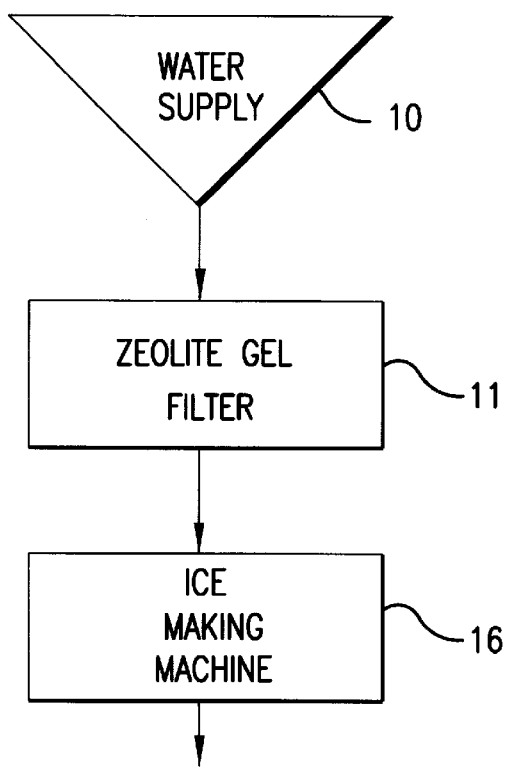
FIG. 6 is a schematic representation of an ice-making system, including a potassium aluminosilicate filter for removing dissolved oxygen and other dissolved and suspended gases and substances from the water supply prior to freezing according to the present invention.

Referring now to FIG. 6, water from water supply 10, after flowing through filter 11, is used for producing ice in an ice making machine 16, whereby the ice cubes so formed from the filtered water are of an unusually high pellucidity due to the virtual absence of dissolved gases and other contaminants in the water. In addition, ice formed in ice making machine 16 from the filtered water improves the taste of most beverages in which it is introduced due to the elimination of impurities. In this instance, ice machine 16 produces ice that is particularly adaptable for making ice tea and ice milk as well as for use in circumstances wherein it is desirable for the ice to be clear.

Figure 7:
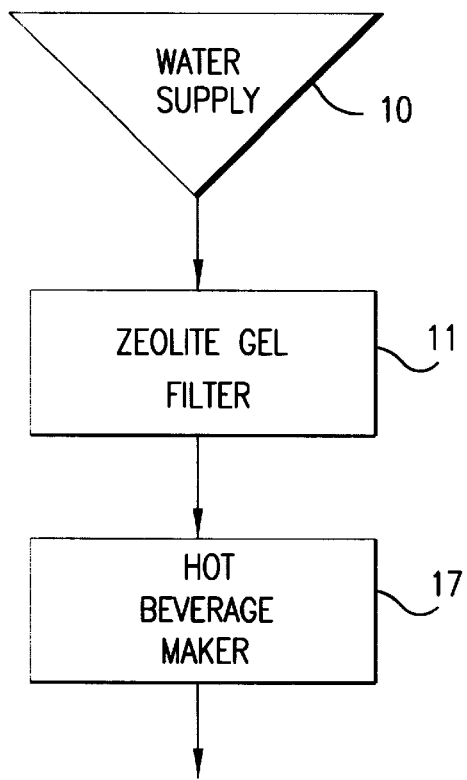
FIG. 7 is a schematic representation of a hot beverage making system, including a potassium aluminosilicate filter for removing dissolved oxygen and other dissolved and suspended gases and substances from the water supply prior to heating same according to the present invention.

In FIG. 7, water from water supply 10, after being treated by filter 11, provides water to a hot beverage maker 17 which may, for example, broadly represent a hot plate with a pot containing water filtered by filter 11 thereon or commercial apparatus that receives the filtered water directly, a percolator, an automatic drip system or an espresso/cappuccino maker, each of which may be used to make a coffee, tea or cocoa beverage with improved taste and appearance due to the elimination or reduction of oxygen and the other substances from the water by action of filter 11.

Figure 8:
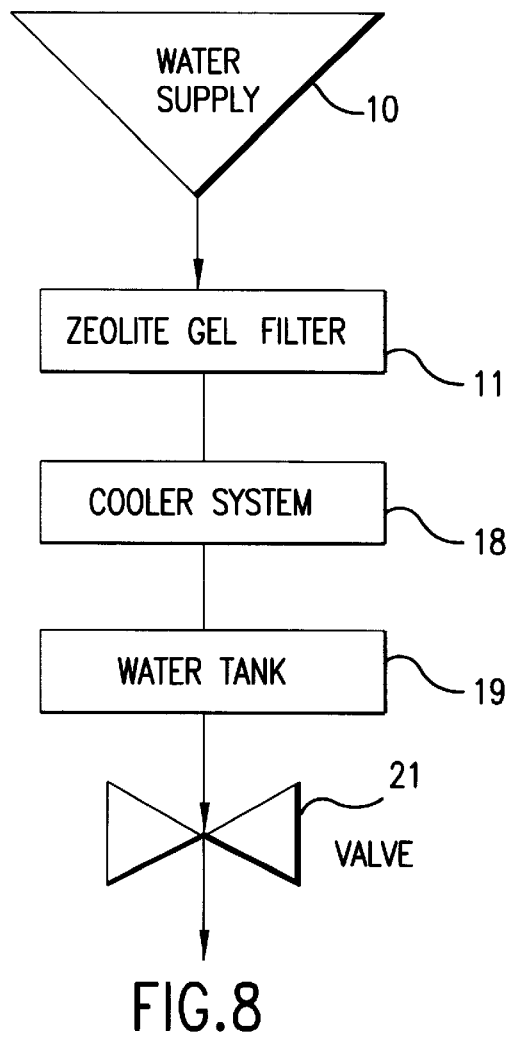
FIG. 8 is a schematic representation of a water-cooler system, including a potassium aluminosilicate filter for removing dissolved oxygen and other dissolved and suspended gases and substances from the water supply prior to cooling the water according to the present invention.

Again, as shown in FIG. 8, filter 11 receives water from water supply 10, filters and transmits it to cooler system 18 which, in turn, dispenses the water, with improved taste and appearance due to the elimination or reduction of oxygen and other substances from the water by filter 11, via an insulated water tank 19, from which the cooled water is drawn through valve 21, when open. If valve 21 is closed, the water remains in tank 19.

Figure 9:
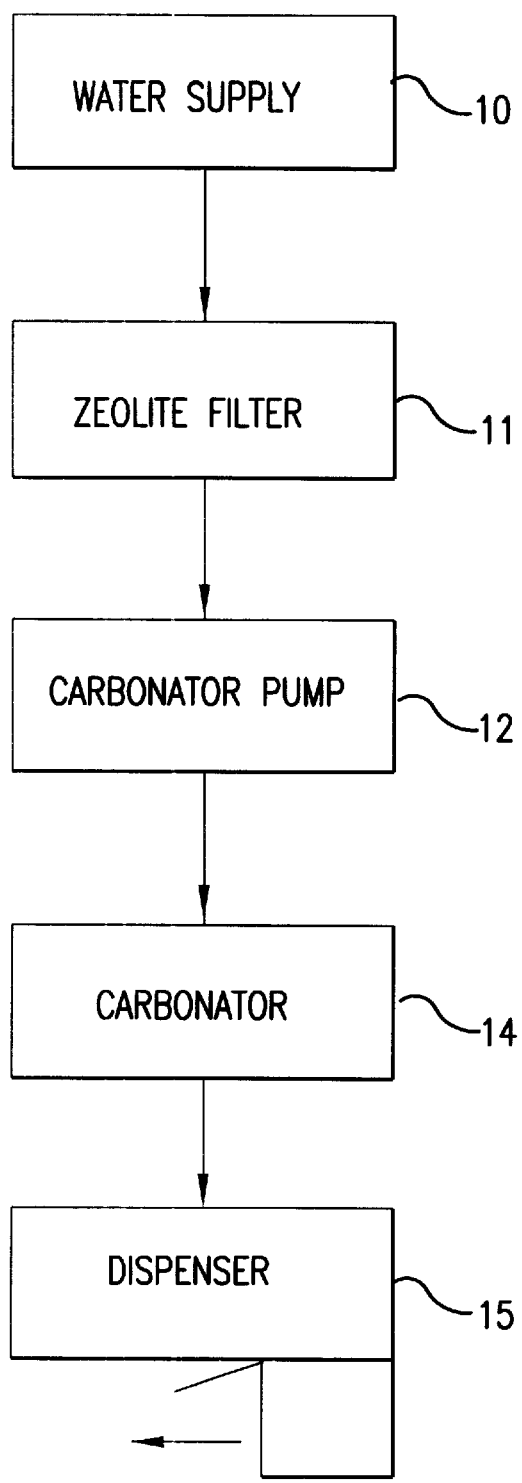
FIG. 9 is a schematic representation of a post-mix carbonated beverage system, including a potassium aluminosilicate filter for removing dissolved oxygen and other dissolved and suspended gases and substances from the water supply prior to carbonation according to the present invention.

Illustrated in FIG. 9 is a post-mix carbonated beverage system which includes filter 11 for rapid treatment of water from a potable water supply 10 before the water is received by the carbonation system comprising a carbonator pump 12 and a carbonator 14. Carbonated water from carbonator 14 is conducted to a dispenser 15.

Between carbonator 14 and dispenser 15, a reservoir or strainer, or both, are sometimes provided. They are not, however, essential to practice the present invention.

With the usual type of carbonation system, it is customary for water to be conveyed to a carbonator 14 from any suitable source via an appropriate pumping or it pressurizing arrangement 12, which may be the pumps of the municipal water system if sufficiently powerful, whereupon pump 12 is not necessary. Once the water reaches the carbonator, it is carbonated with $CO_2$ under a pressure that is usually in the range of thirty to seventy-five pounds per square inch. From carbonator 14, carbonated water is supplied to dispenser 15, where it is blended with a beverage syrup and dispensed as a high quality beverage.

In general, the mixture of carbonated water and syrup is in a proportion of five to one, although other desired proportions can be selected as long as absolute uniformity and high quality result. The $CO_2$, which is normally dissolved under a pressure of two to five atmospheres in carbonator 14, causes the effervescence in the carbonated beverages received from dispenser 15. Depending upon the types of syrups used, the syrups may also be added to carbonator 14 before being received by dispenser 15. In such case, it is customary for a soft drink fountain to have several carbonators 14 and dispensers 15, one for each flavor, and one for carbonated water without flavor.

Carbonation is improved substantially as a result of the filtration through the zeolite gel 35 by 1.9 to 3.9 volumes of carbonation, for example. Regardless of the liquid temperature, carbonation is improved 30% to 100% using the present invention. For example, unfiltered water at 33° F. and at pressure of 20 psi has the capacity to absorb four volumes of $CO_2$. However, the same volume of $CO_2$ absorption can be achieved from 40° F. to 55° F. with use of zeolite gel media 35 to filter the water, although otherwise a volume of 2.0–2.2 $CO_2$ is normally found. Also, carbonation in the serving container is maintained twice as long at many locations around the country where municipal water contains high levels of TDS and gases which would have had a serious adverse effect on the carbonation. Tests conducted in Houston, Tex. reveal that the dispensed soft drinks without the zeolite gel 35 lose fifty percent of their carbonation within one hundred and twenty seconds while water processed with zeolite gel 35, in accordance with the invention retains its carbonation twenty times longer.

Referring again to FIGS. 3–4, strong base anion 36, that has been charged with carbonate or bicarbonate, is advantageously added to filter 11 of zeolite gel in accordance with the invention, to form a primary ion exchange media for use in areas of high domestic water sulphur content. The anion resins and the zeolite gel are both generated by being charged in series with a 5% solution of $K_2CO_3$ or $KHCO_3$. The carbonate or bicarbonate of the strong base anion ionically exchanges and removes the sulfates or sulfites from the water passed through the anion resin of filter 11. When the water so treated is carbonated and mixed with a soft drink syrup to form a soft drink having an acidic pH of about 3.5 or less, the carbonates and bicarbonates in the water break down to form $CO_2$ increasing the carbonation of the soft drink.

Figure 3:
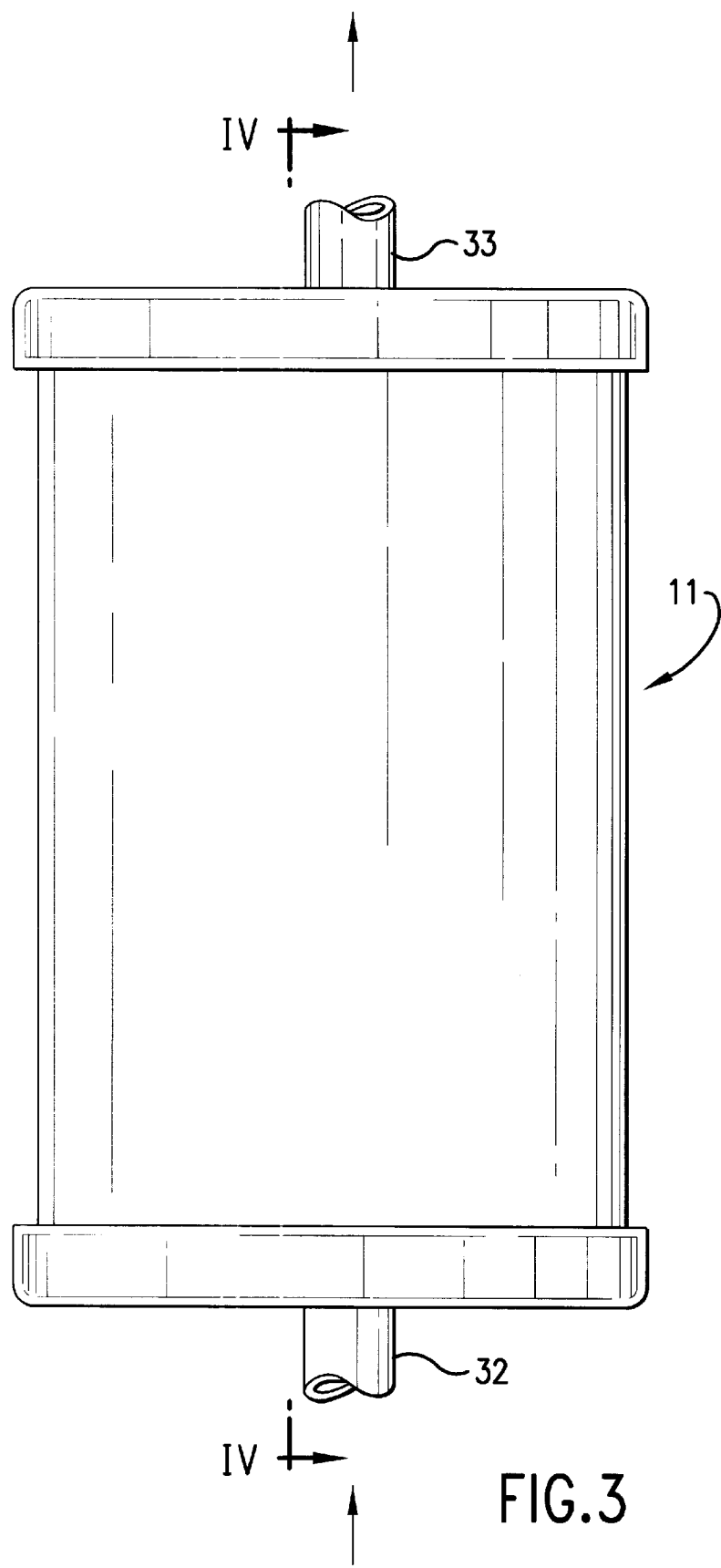
FIG. 3 is an elevational side view of an alternative embodiment of the filter of the present invention wherein a strong base anion is placed in the filter before the potassium aluminosilicate gel media.

Used zeolite gel 35 is reactivated by being heated sufficiently (but not more), to desorb previously adsorbed fluids and gases, including oxygen, and washed with a five (or greater) percent solution of NaOH or NaCl, or if the presence of sodium is undesirable, (as it often is), with a five (or greater) percent solution of $K_2CO_3$, $KHCO_3$, KCl, or other potassium salt as would occur to one skilled in the art, to effect an ion exchange with magnesium and calcium ions in zeolite gel 35, which were previously removed from the water flowing through the filtration media in the course of the filtration process. The reactivated zeolite gel 35 is roughly 80% to 90% as effective as unused zeolite gel 35 and may be reused as reactivated or with unused media mixed therein in various proportions. Using $K_2CO_3$ or $KHCO_3$, when a primary ion exchange media of strong base anion filter 36 is used in the system, as illustrated in FIGS. 3–4, provides the additional benefit of recharging strong base anion filter 36 with carbonate or bicarbonate at the same time as the filtration medium of filter 11 is regenerated.

Figure 10:
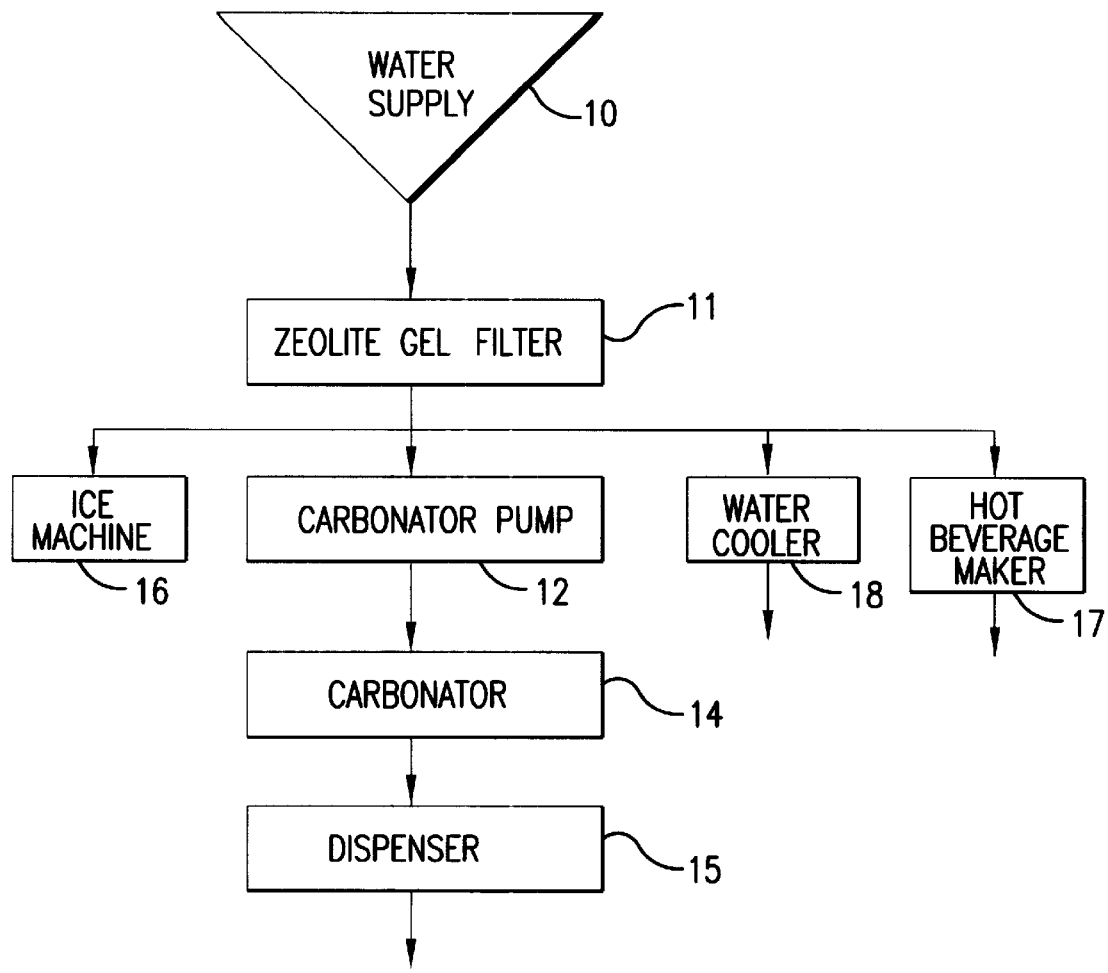
FIG. 10 is a schematic representation of a post-mix carbonated beverage system, having branch conduits to an ice machine, a hot beverage system and a water cooler, including a potassium aluminosilicate filter for removing dissolved oxygen and other dissolved and suspended gases and substances from the water supply prior to carbonation, freezing, heating and cooling according to the present invention.

Referring to FIG. 10, an ice making machine 16, hot beverage making device 17, water cooler 18, and/or carbonator 14, in any combination, separately draw their water through filter 11, whereby the volume of the zeolite gel 35 (or, if desired, and strong base anion 36) in filter 11 is advantageously increased proportionately or more, dependent upon how much water the collective components are using. Here, as in other embodiments, filter 11 may constitute a plurality of cartridges, containing the zeolite media 35, (or containing a strong base anion media 36 in appropriate combination with the zeolite media 35), which are connected in parallel.

Strong base anion resin 36 is composed of commercially available anion resins which are strongly basic in character. Specific examples include resins available from Rohm & Haas Co. under the trademark IRA, and from the Purolite Company under the trademark Purolite A. The resin is charged with a carbonate or bicarbonate, preferably a 5% solution of potassium carbonate. A charging bath of potassium carbonate solution provides a convenient method of charging resin 36 and gel 35 simultaneously.

Chemically, zeolite gel 35 of instant invention comprises by weight 10%–21% alumina trihydrate, $(Al_2O_3.3H_2O)$, and 68%–82% sodium silicate, $(Na_2O.2.88–3.22\ SiO_2+2–4\ H_2O)$, the remaining percentage being initially sodium hydroxide (NaOH). If the sodium in the zeolite is considered undesirable, it is subsequently exchanged for potassium by means of washing the aluminosilicate with solution of potassium chloride or potassium carbonate or potassium bicarbonate sufficient to displace all or a major portion of the sodium in the hydrated aluminosilicate with potassium.

Zeolite gel 35 may also be blended with 15% to 85% activated carbon by weight, and extruded to form particles of selected diameters such as one to twenty microns.

Figure 11:
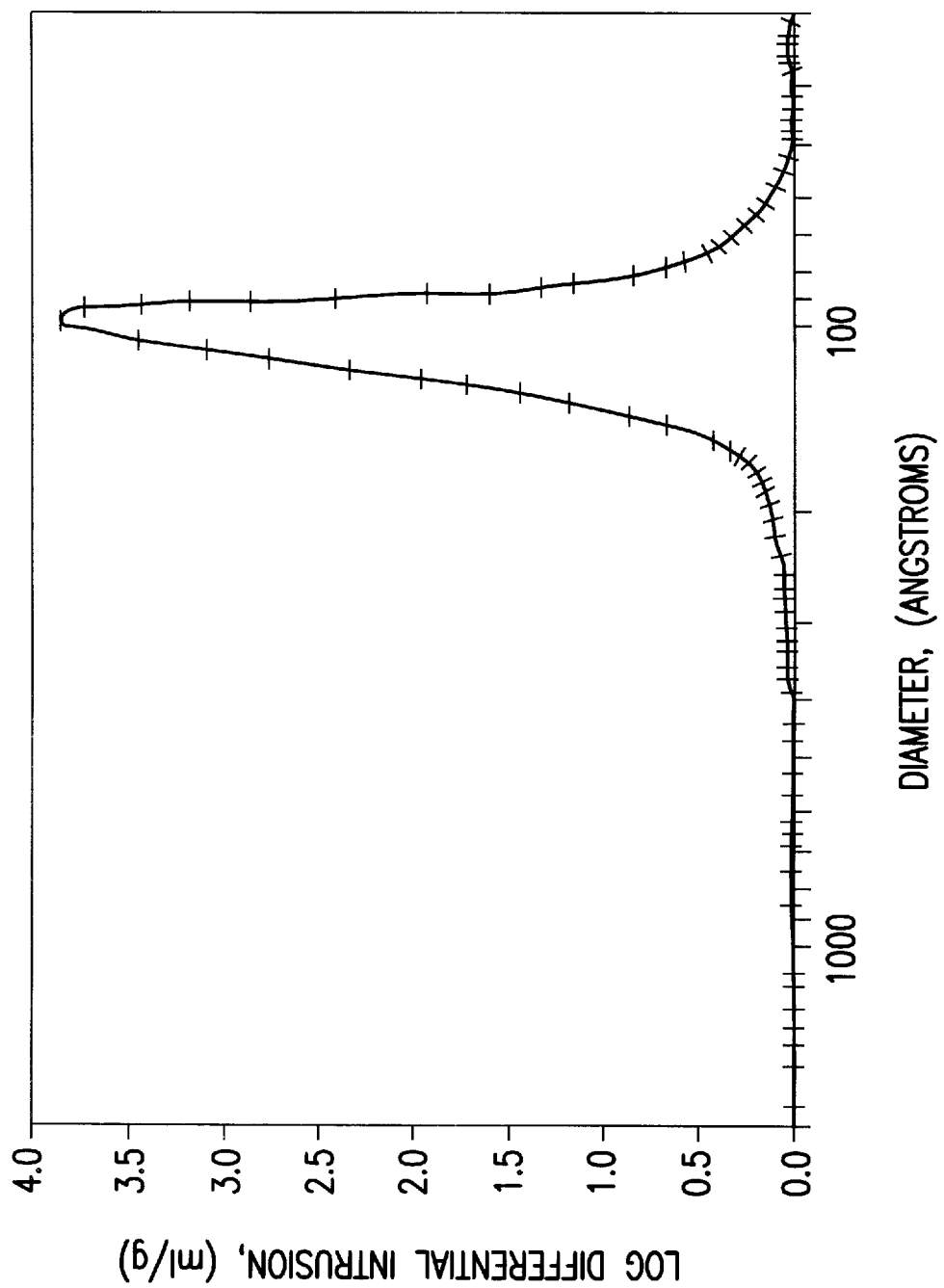
FIG. 11 is a graph of an analysis of a potassium aluminosilicate according to the invention which utilizes mercury intrusion to depict log differential intrusion in milliliters per gram for the material's pores by diameters expressed in Angstroms.

FIG. 11 is a graph which illustrates the distribution of pore diameters of a sample, wherein the pore diameters are between 60 Å and 250 Å, peaking at about 115 Å.

The effective pore sizes of the gel are much larger than in known sodium aluminosilicate zeolite forms, having typical diameters of between about 60 Å and 250 Å, as shown in FIG. 11.

Instead of applying heat, (except for a relatively short period before, or to commence formation of the spongy, porous amorphous structures of the zeolite in its initial gel form), the mixture is exposed to relatively intense ultraviolet radiation in the range of 2000 Å to 3900 Å wavelengths, or to natural sunlight. Use of artificial ultraviolet radiation causes a much more rapid formation of the spongy, porous amorphous structure than sunlight where three to six weeks may be required to produce comparable large spongy, porous amorphous structures.

Although both methods are operable, in accordance with the invention, zeolite gels 35 produced by formation of the spongy, porous amorphous structure under ultraviolet lamps, albeit considered comparable, are nevertheless considered distinct from those produced in accordance with the invention under sunlight in that the former's pores are more uniform in size and the spongy, porous amorphous structure of the zeolite is more predictable and has relatively less variations. An average pore diameter as great as 180 Å and average pore volume of 0.79 ml/g have been achieved with an extremely high uniformity of pores. Typically, the surface area of the zeolite filtration media is in the range of 175 to 450 square meters per gram of the media.

The formation of zeolite gel 35 in accordance with the invention can be time consuming. Both the time required to produce the spongy, porous amorphous structures and their quality appears to be affected to a substantial degree by the purity of the initial material, the temperature at which the process is carried out, and the intensity of the ultraviolet radiation. Two to ten weeks may elapse before the spongy, porous amorphous structures are completely formed, uniform and stable. Pore diameters and volumes, if zeolite gel 35, while being made, is heated above 390° F., are substantially reduced. The same occurs if too much pressure is applied to zeolite gel 35 material. However, once the zeolite gel 35 has been completely formed, it is more robust; although its structure will be adversely affected if heated to as high as 700° F.

It is not entirely clear why the zeolite gel 35, which is produced in accordance with the invention, has the capacity to adsorb as much of the oxygen dissolved in water as it does. All zeolite molecular sieves in spherical form I have tested immersed in water do not remove oxygen from the water in adequate amounts. They have lost (or immediately lose) 100% of their adsorption capacity. If the zeolite gel 35 product, in accordance with the invention, is heated during production to temperatures substantially above 390° F., its capacity to adsorb dissolved oxygen in water at flow rates of between one and seven gallons per minute is substantially reduced. However, after production the potassium aluminosilicate in accordance with the invention is completed, it can be heated up to 700° F. without significant detriment to its adsorption characteristics.

Also, if the ratio of alumina to silica is increased, although general ion exchange capacity increases, oxygen adsorption is reduced. Based on this, it is thought that amorphous silica alumina gel with potassium is a key player in the reduction of oxygen is and hydrogen, but without ion exchange, it will not function.

Further, it is theorized that in the radiation of zeolite gel 35 under ultraviolet light, cross-linking by shared oxygen atoms of the three-dimensional frameworks of $SiO_4$ and $AlO_4$ tetrahedrons is incomplete, or that the potassium cations which are formed are preferentially selective for oxygen atoms. In either event, or for whatever reason, zeolite gels 35 made and used in accordance with the invention exhibit a surprising capacity to remove large amounts of dissolved oxygen from the water that is a prime cause for reduced carbonation of water, adverse tastes and reduced clarity of ice and altered taste and appearance of hot and cold beverages in various areas of the United States.

In tests of the invention, as indicated above, the filtration media contained in the filtration units of between 40 cubic inches and 2.5 cubic feet of zeolite gel 35 media dramatically improved the carbonation of water that had a considerable amount of dissolved oxygen in its water supply. In at least one test using a large cartridge, (twelve inches inside-diameter by forty inches inside4ength), over 22,000 gallons were treated wherein the flow rate was one to seven gallons per minute. The zeolite gel 35 filter continued, even after the 22,000-gallon point was reached, to remove dissolved oxygen from the water, albeit at a reduced rate of about fifty percent.

The substitution of potassium for sodium offers a favorable medium for ion exchange within zeolite gel 35 wherein the water is thereafter carbonated. In studies of the use of the present invention, a reduction of calcium content, calcium bicarbonate content and water hardness of 100% occurred. This is believed due to ion exchange between the water's calcium ions and the potassium ions of the zeolite gel 35. The undesirable addition of sodium prior to carbonation of water, as was the case in the previous use of zeolite to soften water, is thus avoided. Of course, the free carbonate and bicarbonate ions, when subsequentially placed in an acidic solution through the mixing of the soft drink syrup with the treated water, provide the added benefit of increased carbonation due to the carbonates and bicarbonates breaking down to form $CO_2$.

For reducing hardness and dissolved gases, the present invention can also be used advantageously in conjunction with ice makers (as shown in FIGS. 6 and 10), to produce ice with improved clarity, water for water coolers (as shown in FIGS. 8 and 10), having an improved taste and appearance, and water for hot beverage makers (as shown in FIGS. 7 and 10), to prevent the precipitation of calcium in the hot beverage and to reduce dissolved oxygen in the water to provide a better taste.

Further, it has been found that hydrogen sulfide is reduced 100%, ammonia and sodium sulfite are reduced 90% to 100% and other impurities, such as zinc and copper, are reduced by adsorption into zeolite gel 35.

In addition, the adsorption of gases into the zeolite gel 35 during the filtering operation tends to destroy microorganism growth within or on the structure of the media.

Furthermore, it has been found that potassium can be regenerated within zeolite gel 35 after exhaustion and, as regenerated, the filtration media maintains 80% to 90% of its original capacity.

The dramatic results of these findings lead one skilled in the art to conclude that the utilization of this invention to any application where the quality of water is important, not only in respect to impurities and hardness but also dissolved gases and particularly oxygen, is desirable.

The invention is illustrated by the following Examples:

EXAMPLE I

Commercial water glasses composed of 8.9% by weight $Na_2O$ and 28.7% by weight $SiO_2$, the remainder $H_2O$, were blended with 21% of Al(OH)$_3$ in crystalline powder form. Eleven percent by weight of sodium hydroxide (0.929 moles of NaOH per liter) was added and mixed until homogeneous. The mixture was transferred to a spongy, porous amorphous structure formation tank where it was cooked with a steam batch (about 390° F.) for 10–16 hours. The resulting gel was then placed into two-inch deep Pyrex trays, the depth of the gel therein being about one inch (2.5 cm).

Thereafter, the gel was exposed to continuous and intense ultraviolet radiation from both above and below the trays while formation of the spongy, porous amorphous structure proceeded for seven days until formation of the spongy, porous amorphous structure was complete.

The resulting spongy, porous amorphous gel structures were sized and screened to produce zeolite particles between 8 and 60 mesh. For uses wherein the presence of sodium in zeolite gel 35 was considered detrimental, such spongy, porous amorphous structures were placed in 36 liters of 5% solution of KCl for 0.2 hours which was maintained at a temperature of 20° C. to effect a complete substitution of potassium for sodium in the gel.

The resulting material was washed with 200 liters of clean water until pH of 8.5 was measured.

The zeolite gel 35 product had a total pore volume of 0.73 cc per gram and a surface area of 175 square meters per gram. The pore diameters were 100 Å to 250 Å, peaking at 160 Å.

Using twenty kilograms of media 35 to filter municipal water at a flow rate of three gallons per minute, the following removal of dissolved oxygen occurred:

| Gallons of water | 100 | 500 | 2000 | 3000 |
|---|---|---|---|---|
| Influent water (dissolved oxygen) | 5.6 mg/L | 6.2 mg/L | 6.1 mg/L | 5.7 mg/L |
| Effluent water (dissolved oxygen) | 0 | 0 | 0 | 0 |

Thereafter the water was received in a carbonator where the volumes of carbonation were increased from 1.9 (without O$_2$ removed) to 3.9 (O$_2$ removed).

Figure 12:
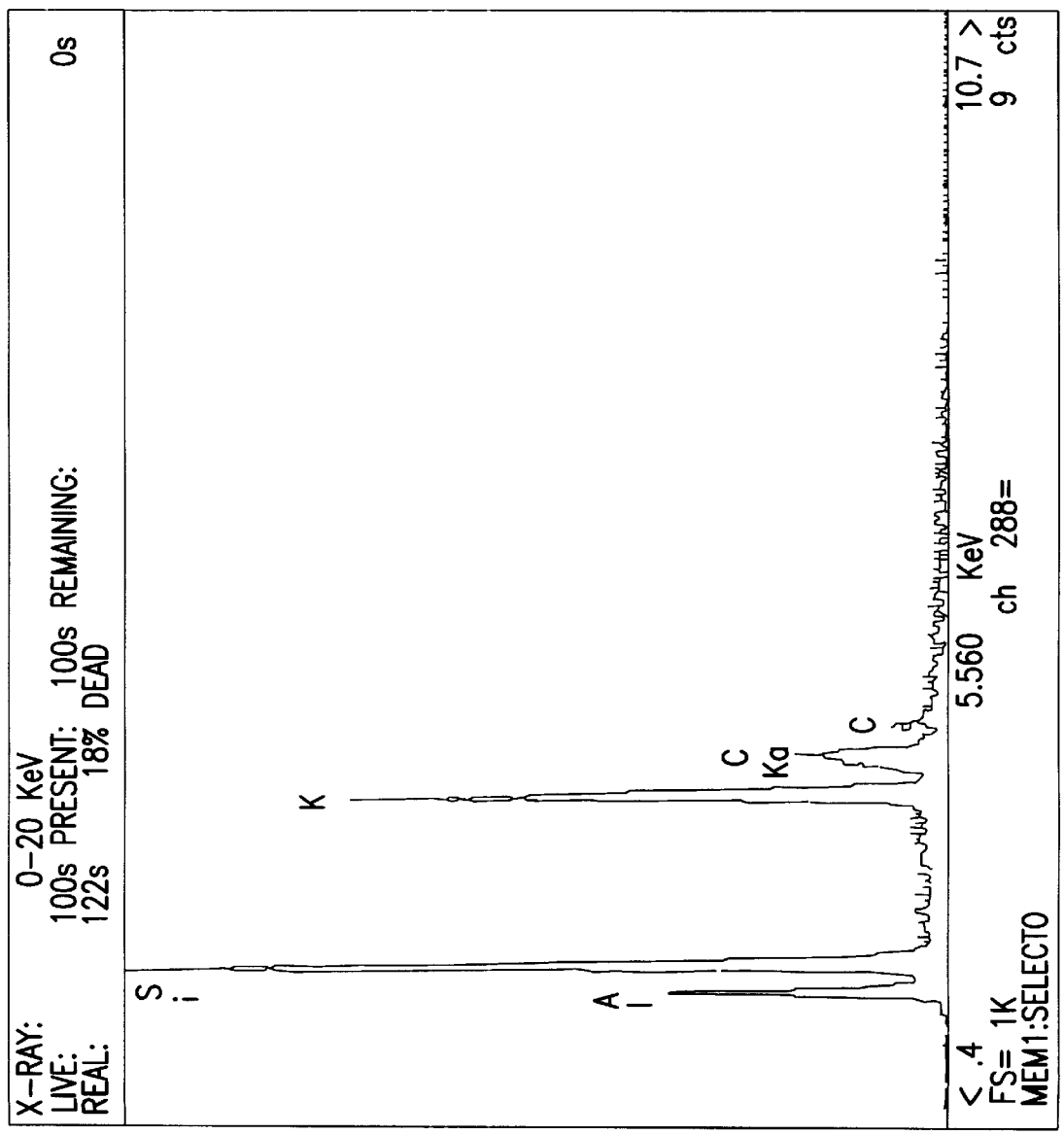
FIG. 12 is an X-ray diffraction pattern of the product hereinafter presented in EXAMPLE I.

X-ray diffraction pattern of the dry sample is shown in FIG. 12. Peaks labelled Si denote the X-ray diffraction of the standard used, CaF$_2$, Al denote impurities due to the testing equipment, and C denotes the crystalline material. From FIG. 12, it is seen that less than 1% of the sample from EXAMPLE I is crystalline.

EXAMPLE II

Amorphous silica gel in 8×40 mesh, 5000 gram weight with 24 liters of water, mixed with 1100 gram weight of dry pellet sodium hydroxide and 800 gram weight alumina boehmite was place in an autoclave to create hypothermal reaction at about 300° F. for 2–6 hours to produce amorphous silica gel zeolite. The forming gel was dried for ten days and washed with DI water and then charged with an ion exchange wash to replace sodium for potassium. Final product in dry form had the following weight percentages: Alumina, 7.90%; Potassium 10.00%; and SiO$_2$ 81.00%; the remaining percentage water.

Oxygen reduction using the filtration media of the sample of EXAMPLE II was less than obtained by the sample from EXAMPLE I.

The zeolite gel 35 product of EXAMPLE II compared, however, closely insofar as pore volume, pore area, and pore diameters are concerned with Example I.

In a still further example, the alumina to silica ratio was lowered in zeolite gel 35 to where the alumina weight is 14% and the silica weight is 72% to 76%. With a silica weight to alumina weight ratio of seven to one, the zeolite gel proved to have 20%–40% more capacity for gas where total dissolved solids and hardness of the water is in the low levels or if the pH of the water exceeds 8.

"Zeolite gel" as used in the specification and claims, except as otherwise indicated, refers to an amorphous aluminosilicate material which, insofar as its pore sizes and effective surface areas are concerned, is considered to encompass or be the equivalent of mesoporous molecular sieves having pore diameters within the general range of four to fifty nanometers.

Advantageous use of the present invention can be found in the food packaging and preserving industry, for household and commercial plumbing and hot water systems, for the use and care of boilers and in the chemical industry. Instead of the initial steam heating treatment, microwave radiation can be substituted to shorten the period involved. Also, although within the ambit of this invention, sodium and potassium are not considered equivalents for the preparation of foods and beverages for human consumption. For other purposes wherein they and other chemicals are known to be of an equivalent nature, they may be substituted for them.

Because the filtration media in accordance with the invention is rapid as well as effective in removing unwanted gases and other impurities from drinking water, it can be used for inverted bottle type dispensers wherein the bottles are periodically filled with water from the local municipality instead of imported spring or specially treated water.

Figure 13:
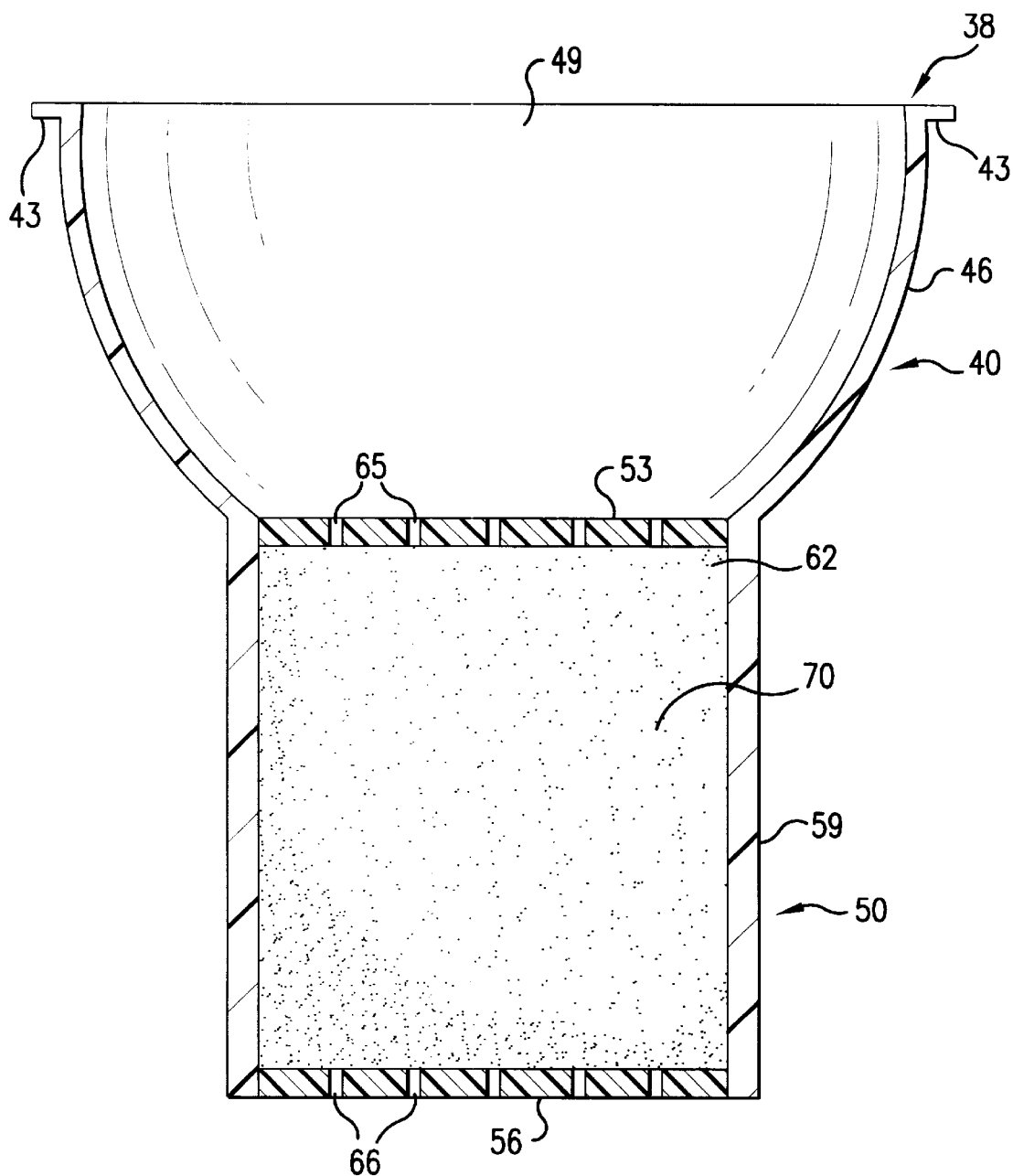
FIG. 13 is a vertical cross-sectional view of the filter basket of a preferred embodiment according to the invention.
Figure 14:
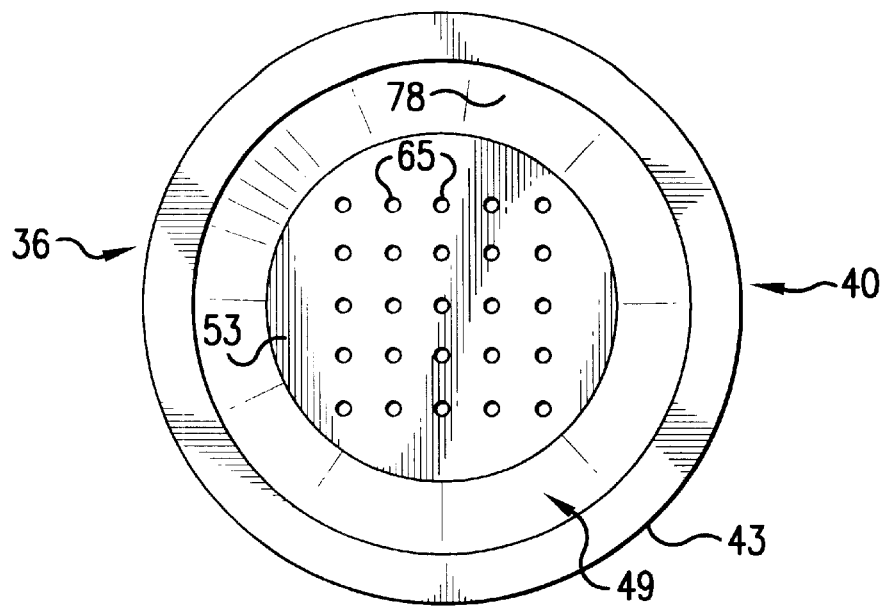
FIG. 14 is a top plan view of the filter basket of the preferred embodiment shown in FIG. 13 according to the invention.
Figure 15:
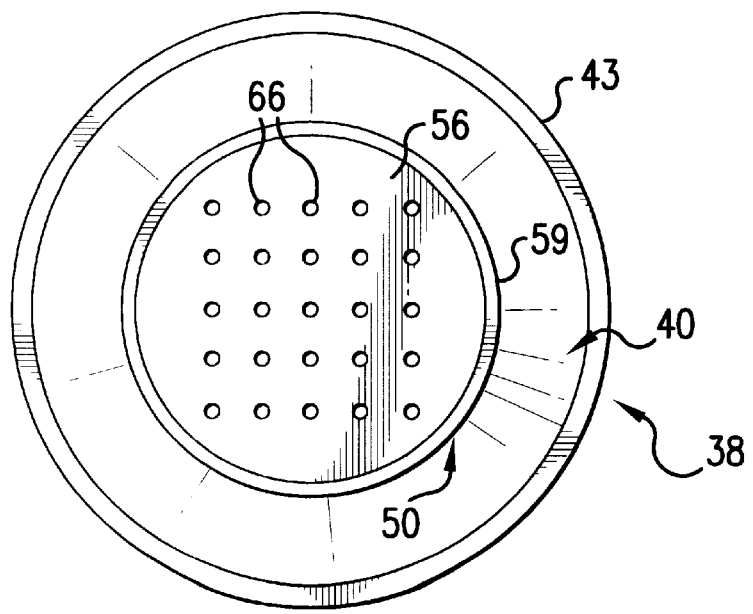
FIG. 15 is a bottom plan view of the filter basket of the preferred embodiment shown in FIG. 13 according to the invention.
Figure 16:
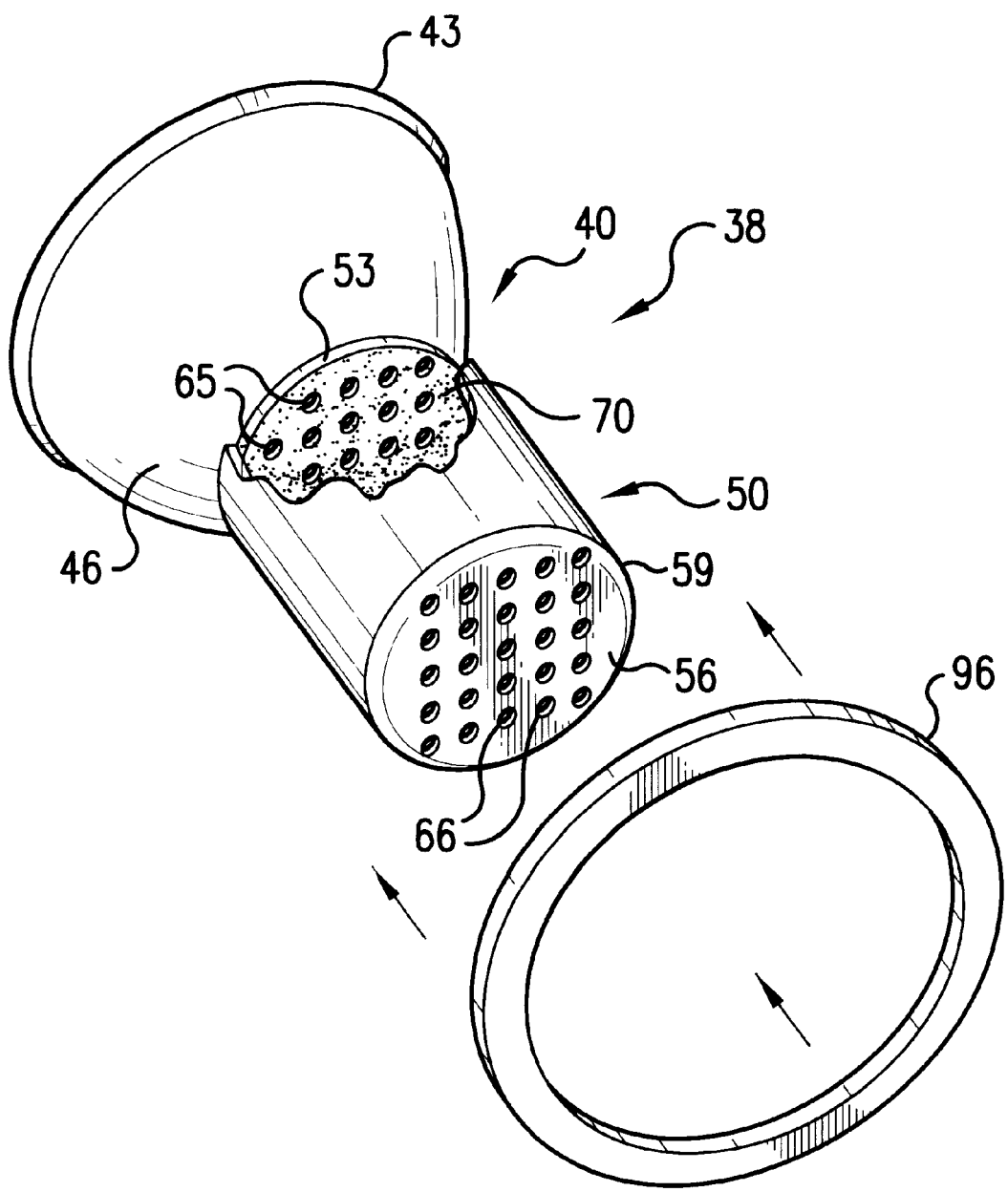
FIG. 16 is an isometric view of the filter basket of the preferred embodiment shown in FIGS. 13–15 according to the invention, expanded to show a universal adapter which is used with the filter basket.

Referring to FIGS. 13 through 17, the upper portion of filter 38 is a receiver or conical section 40, which preferably is circular when viewed from above to match the shape of the mouth of most conventional water-stands. Receiver section 40 is funnel-shaped or conical, having convex sides in the embodiment shown, with lip or flange 43 extending outwardly about one to four millimeters (about $\frac{1}{16}$th to $\frac{3}{16}$ths inches) on top of the convex funnel-wall 46 which surrounds the funnel's mouth 49. As seen in FIGS. 13 and 14, lip 43 extends outwardly from wall 46 at the top of funnel portion 40 around the top circumference of mouth or passage 49. Wall 46 of funnel section 40, converges downwardly (as shown in FIGS. 13 and 16) to filter section 50, providing a converging path for the flow of water to a planar plate comprising a perforated top 53 of filter section 50.

As shown in FIGS. 14 through 16, filter section 50 is preferably cylindrical in shape, preferably two to four inches in diameter, with a top substantially defined by top plate 53, a bottom substantially defined by bottom or base plate 56, and a lateral side substantially defined by cylinder-wall 59. Filter section 50 has a substantially cylindrical interior bore to define filter compartment 62.

As seen in FIGS. 14 and 15, top plate 53 and bottom plate 56 are perforated by a plurality of apertures 65 and 66, respectively, to allow the passage of water through top plate 53 and bottom plate 56. Apertures 65 and 66 are preferably about three millimeters and not less than two millimeters in diameter and provide a combined open area so that a sufficient flow rate of water through filter section 50 occurs.

The individual open area of apertures 65 and 66 are small enough to prevent filter media 70 from being carried out of compartment 62. Optionally, screening material of appropriate mesh can be used between media 70 and, respectively, top plate 53 and bottom plate 56.

Filter compartment 62 is substantially entirely filled with filter media 70. Media 70 is sufficiently porous so that water can pass at an adequate rate downwardly therethrough while being filtered to remove harmful or distasteful substances and so that air can rapidly pass upwardly therethrough as necessary to displace dispensed water.

Referring again to FIGS. 11 and 12, an example of filter media 70 which is used advantageously in filter 38 is an aluminosilicate gel which is prepared from 21% by weight of alumina hydrate type pseudoboehmite $Al(OH)_3$ and 68% to 72% sodium silicate $Na_2O.3.22–2.88\ SiO_2$, which are mixed with 11% to 14% by weight sodium hydroxide NaOH in a 5% concentration, and blended into a slurry. The slurry is filtered, washed with clean water, permitted to gel, heated with steam to initiate formation of the spongy, porous amorphous structure, and laid over a flat bed wherein the hydrogel is formed under ultraviolet radiation (wave lengths of 2000 Å–3900 Å) at ambient temperature (68° F.–102° F.) in a low relative humidity (5%–20%) for two to ten weeks with about sixty days being typical. As a practical matter, the heat generated in this step tends to maintain the effective relative humidity in the desired range. Heat and ultraviolet radiation make the large particles intergrow to vermicular particles forming microporous spongy structures which allow water to enter, flow through and discharge therefrom relatively fast while the desired ion exchange takes place in the structure of the gel.

The alumina hydrate which is used has particle sizes of about five microns for about 75% of the material, and five to ten microns for about 100% of the material. Dispersed alumina can also be used.

Although after the gel has commenced to form, ultraviolet radiation is no longer necessary and the formation of the microporous spongy amorphous structure can be completed without further subjecting the substance to such radiation, it is preferred that the radiation be continued until formation of the microporous spongy amorphous structure of the aluminosilicate gel is complete—at least to having the desired pore sizes. Preferably, intense ultraviolet radiation is provided by ultraviolet lamps.

To substitute potassium for sodium, when the formation of the spongy, porous amorphous structure of the gel is complete, the gel is washed with pure water and placed in a bath of a potassium salt, preferably potassium carbonate or, for example, potassium chloride, wherein the potassium displaces sodium in the aluminosilicate gel.

The resulting potassium aluminosilicate is thoroughly washed with deionized (DI) water, dried and screened to produce a particle size of 8 to 60 mesh, preferably 24×40 mesh, which is packed in polyglass or plastic cylinders or cartridges, having a total volume of about one hundred, fifty to over two hundred, fifty cubic centimeters. The resulting gel is translucent in water, but in its dry form is an opaque white, hard material similar in appearance to talc.

The potassium aluminosilicate product is sufficiently robust for commercial use and if subsequently not heated above about 700° F., retains its surprising large pore diameters and pore volumes as well as a large effective internal surface areas. Moreover, water flows relatively rapidly therethrough while its effective filtration characteristics are retained.

The resulting potassium aluminosilicate product had a total pore volume of 0.73 cc per gram and a surface area of 175 square meters per gram. The pore diameters were 100 Å to 250 Å, peaking at 160 Å. FIG. 11 is a graph which illustrates the distribution of pore diameters of another but similar sample, wherein the pore diameters were between 60 Å and 250 Å, peaking at about 115 Å.

X-ray diffraction pattern of a similar dry sample is shown in FIG. 12. Peaks labeled Si denote the X-ray diffraction of the standard used, $CaF_2$, Al denote impurities due to the testing equipment, and C denotes the crystalline material. From FIG. 12, it is seen that less than 1% of the sample from the Example is crystalline.

The capacity of the potassium aluminosilicate filtration media 70 for oxygen removal is between fifteen and forty-five ounces of oxygen per cubic foot of the filtration media. At the same time, the filter removes virtually all ammonia ions in the water. If hydrogen sulfide is present, it is also removed. Also, a reduction was found in the levels of calcium bicarbonate, calcium, sodium sulfite, hydrogen, lead, copper and zinc, when present.

In studies of the use of the present invention, a reduction of calcium content, calcium bicarbonate content and water hardness of 100% occurred. This is believed due to ion exchange between the water's calcium ions and the potassium ions of the aluminosilicate filtration media 70. Further, it has been found that hydrogen sulfide is reduced 100%, ammonia and sodium sulfite are reduced 90% to 100%. Tests indicate that two hundred cubic centimeters of aluminosilicate filtration media can meet NSF Standard 53 for lead and zinc reduction and NSF Standard 42 for taste and odor and esthetic effects. Aluminosilicate filtration media 70 shows a kinetic of one hundred, substantially removes lead from water wherein the water has ninety milligrams of lead per liter and demonstrates a shorter contact time than organic resin. It exceeds EPA standards for heavy metal reduction. The unique structure of the potassium aluminosilicate filtration media also reduces bitter elements from drinking water which adversely affect its taste, mainly in coffee or tea made from the water.

Aluminosilicate filtration media 70 packed inside filter 38 is preferably one hundred and fifty to two hundred and fifty cubic centimeters in volume and has the capacity to filter five hundred gallons of water before its effectiveness is sufficiently reduced. The average particle diameter for potassium aluminosilicate filtration media 70 is preferably approximately fifty microns although in some applications, where the user is less concerned about flow rate and more concerned about sanitation, a ten micron average or less is preferable. Nevertheless, at fifty microns, flow rates of water to reservoir 93 as high as one thousand, five hundred cubic centimeters per minute have been observed. This rapid flow rate is believed to result from the unique porosity of media 70 which permit a relatively swift air and water flows therethrough. Furthermore, the volume of media 70 depends upon the desired flow-rate of water. Adequate flow rates are obtained with media 70 having a volume as little as five cubic inches.

The potassium aluminosilicate filtration media 70 can function at pH of 5.5–9 without affecting the performance of the filter in taste improvement and lead reduction.

Other filtration media can be mixed with or used in conjunction with the potassium aluminosilicate media advantageously in filter 38 such as: activated carbon, organic ion exchange media such as Purolite C107E, a weak acid cation exchange resin, aluminum oxide, metal oxide resins such as zirconium oxide, and strong base anion resin, or a mixture of any of these and the potassium aluminosilicate media described hereinbefore. Activated carbon is an effective dechlorinator. For example, an advantageous media 70 is a blend of fifty to sixty per cent by volume of granular potassium aluminosilicate media, 20×40 mesh, and forty to fifty per cent by volume of three mesh granular activated carbon. Three mesh granular activated carbon, mixed in the media at fifty per cent by volume, provides sufficient porosity to media 70 while providing for the removal of chlorine from water 99.

The potassium aluminosilicate gel is advantageously formed in different configurations and different ratios of mixture with carbon to compose media 70. As a representative illustration, media 70 utilizing the potassium aluminosilicate gel, is mixed, with activated carbon of more or less the same size particles at a beneficial ratio of ten to fifteen per cent by volume potassium aluminosilicate gel to eighty-five to ninety percent activated carbon. The blend is then molded to provide particles having twenty to forty micron diameters.

Figure 17:
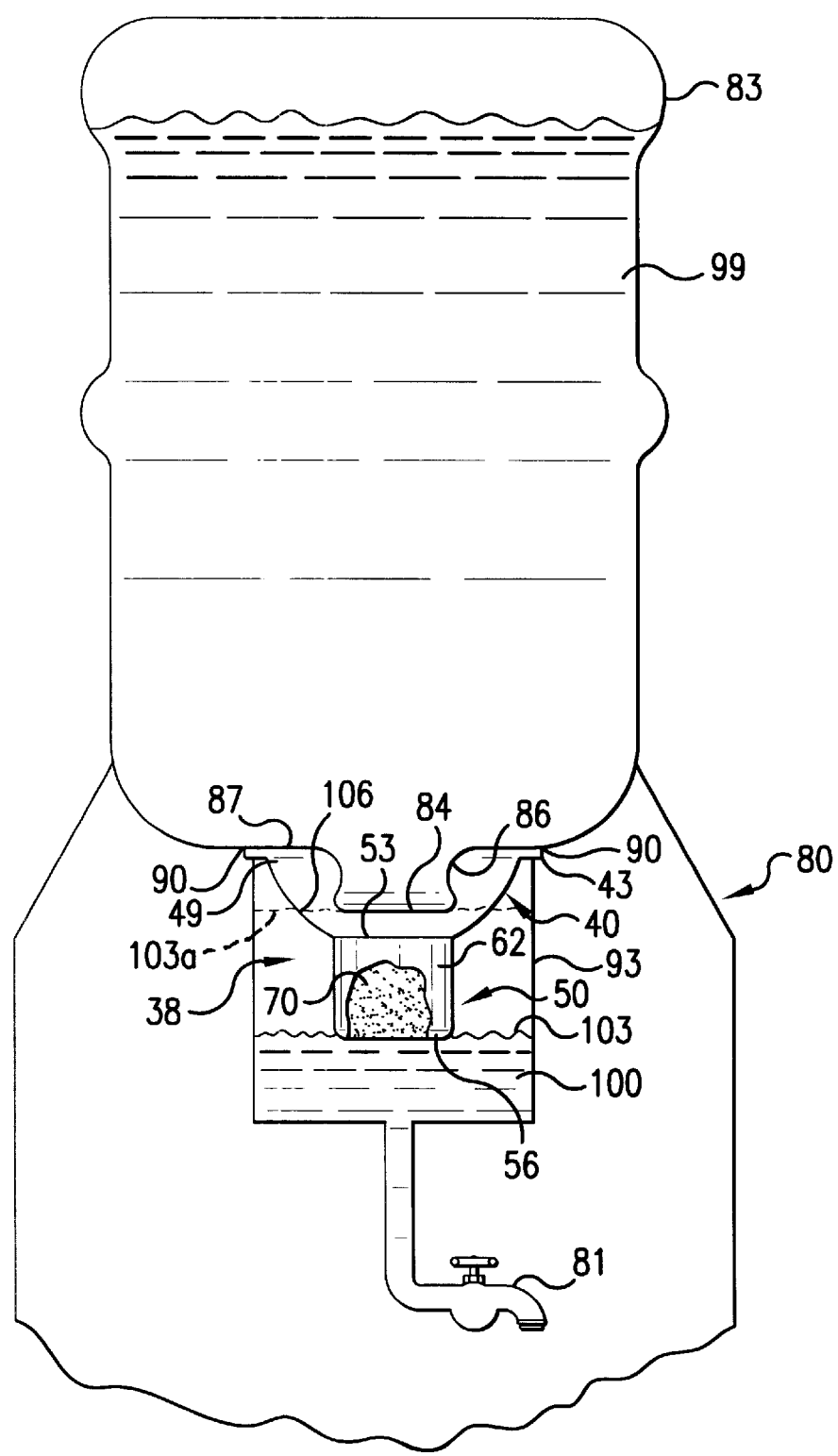
FIG. 17 is a front elevational view of an upper section of a conventional household water-cooler, shown by way of example, wherein the filter basket and reservoir of the dispenser are shown in section.

Referring to FIG. 17, filter basket 38 is easily installed in conventional inverted bottle type water dispenser or olla 80. With water-bottle or carboy 83 removed from dispenser 80, basket 38 is placed over and into fill-port or mouth 87 with flange 43 resting on collar or shoulder 90 of dispenser 80 and the rest of basket 38 depending therefrom into reservoir 93. If desired the water available from the water-stand is increased by pouring tap water from a conventional source (such as a pitcher) through basket 38, intervening media 70, to be received in reservoir 93 to a level above top plate 53 and above the level of where bottle opening or mouth 84 will be located when bottle 83 is inverted and received in olla 80.

Generally, the shoulder of carboy 83 bears directly on lip 43. However, to adapt basket 38 to reservoir 93 if basket 38 is too small, an appropriately configured spacer ring or doughnut shaped member (not shown) or a plurality thereof may be fitted between the top of reservoir 93 and lip 43. Also, if desired, gaskets may be provided, either over or below or both, of lip 43 and/or any spacer provided.

Flange 43 has an outside diameter slightly greater than most conventional fill-ports 87 found in water dispensers 80 to provide support from reservoir for basket 38. But to accommodate a larger diameter, a universal adapter ring or doughnut ring 96 is advantageously also included with the invention to be removable attached to lip 43 and thereby extend the reach of flange 43 for supporting filter 38 (as shown in FIG. 16).

For clarity, adapter ring 96 is only shown in FIG. 16. The manner in which ring 96 provides support for basket 38 from dispenser 80 with a large diameter fill-mouth 87 will be obvious to one skilled in the art familiar with this description. Ring 96 has an inside diameter slightly less than the outside diameter of lip 43. Adapter ring 96 has an outside diameter greater than found in larger inlet fill mouths 87 of most common inverted water bottle type water dispensers 80. By slipping filter 38 through ring 96 until lip 43 contacts adapter ring 96, filter 38 can be supported from collar 90 for almost any large fill mouth 87 found in a common inverted water bottle type water dispenser 80.

The water bottle or carboy 83 is filled from an ordinary household water tap or any other suitable source of potable water 99. With basket 38 depending from the top of reservoir 93 into reservoir 93, bottle 83 is inverted and set upon dispenser 80 so that its neck 86 and opening 84 therefrom are received into mouth 49 (as seen in FIG. 17) and bottle-opening 84 is one-quarter to one-half inch above cover 53 of filter compartment 62. Unless water has already been added to reservoir 93 to receive bottle opening 84, water 99 drains from bottle 83 into receiver 40. Due to the generally conical shape of receiver 40, water 99 flows in a downwardly directed converging flow-path so that all the water received into by reservoir 93 flows downwardly through filter section 50 and filtration media 70.

From funnel section 40, water flows downwardly through perforations 65 of top plate 53 into filter compartment 62 where it is filtered of deleterious substances by filter media 70. Water flowing through filter media 70 drains to bottom plate 56 and therefrom through perforations 66 into reservoir 93.

Unless previously filled, water 100 fills reservoir 93 until the surface level of water 100 rises at least higher than bottom plate 56. If the combination of the top of reservoir 93, flange 43 and the adjacent surface 90 of bottle 83 provide a hermetic seal, air pressure in reservoir 93 will create a water level 106 within filter basket 38 which engulfs bottom-opening 84, thus substantially preventing the further reception of fluid into basket 38. (If, however, water was initially added to reservoir 93, head surface 103 will be initially higher until eventually lowered by usage of water from dispenser faucet 81.) Untreated water 99 from bottle 83 continues to fill basket 38, being displaced with air received therein, until bottle 83 is empty. Thereafter water in reservoir 93 is drained by opening dispenser faucet 81 which admits displacing air into reservoir 93.

The foregoing description presumes a hermetic seal between the atmosphere and the space above filter basket 38 and another hermetic seal between the space above water level 103 in reservoir 93. As a practical matter though, a completely airtight seal between either or both of these spaces is rare; if there is at least some ventilation through these spaces, ranging from substantial air leakage, whereby these spaces remain substantially isopiestic throughout the operation of dispenser 80, to ventilation which is virtually nil, wherein the pressure in the spaces equalizes only over significant periods of time. Accordingly, in ordinary circumstances, surface head 103 will, at least eventually, raise to the height of surface head 103a (depicted in FIG. 17 as a dashed line), which is equal to the height of surface head 106. But, irrespective of air leakage into the space above water levels 103, 103a and 106, there is little difference in the operation of dispenser 80 insofar as a user is concerned.

As shown in FIG. 17, filter basket 38 operates well even without ventilation for the space between the top of filter basket 38 and the bottom of bottle 83 (i.e.—mouth 87 is hermetically sealed by the contact between bottom of bottle 83 and collar 90 and by the contact between flange 43 and collar 90). When, for example, five ounces of water 100 is drained from reservoir 93 via valve 81, a substantially equal volume of air enters reservoir 93 through either valve 81 or other venting system which may be provided for reservoir 93. Air then vents from valve 81 (or other source) into basket 38 through perforations 66, and passes through filter media 70 and perforations 65, into receiver 40. From there it is received either directly or via the space above water level 106. Five ounces of displaced water 99 drains from bottle 83 into and from basket 38 into reservoir 93 and hence through valve 81. Should the air or part of it vent into the space water level 103, causing it to lower momentarily, that air will be received in perforations 66 of bottom plate 56 and by bottle 83 via media 70 directly on via the space above water level 106 until isoplestic conditions are restored. Thus whether air passes through filter 38 directly into bottle 83, without first entering the space above surface head 103 of reservoir 93 and/or the space above surface head 106 in receiver 40, dispenser 80 will still operate effectively. Moreover, because media 70 is exceptionally porous as well as being effective, this invention overcomes the requirement of a complex mechanism for venting by utilizing the venting system already existing for reservoir 93.

Again, as a practical matter, the described hermetic sealing seldom occurs; ordinarily, there will be some amount of ventilation between these spaces and, at least eventually, head 103 will equal head 103a.

Because receiver 40 surrounds mouth 87, and overlaps the top of reservoir 93, virtually all particulates on top of bottle 83 and on neck 86 are prevented by filter 38 from entering reservoir 93. Still further, when bottle 83 is removed from dispenser 80, any airborne particles are also prevented from entering reservoir 93 by filter 38. Yet further, due to its funnel-shaped top, the chances of spilling water on the floor from tilting of bottle 83 are substantially reduced. If desired to guide air from spigot 81 as it transits through filtration media 70, an inverted funnel similar to receiver section 40 can be affixed to the bottom of compartment 62.

Figure 18:
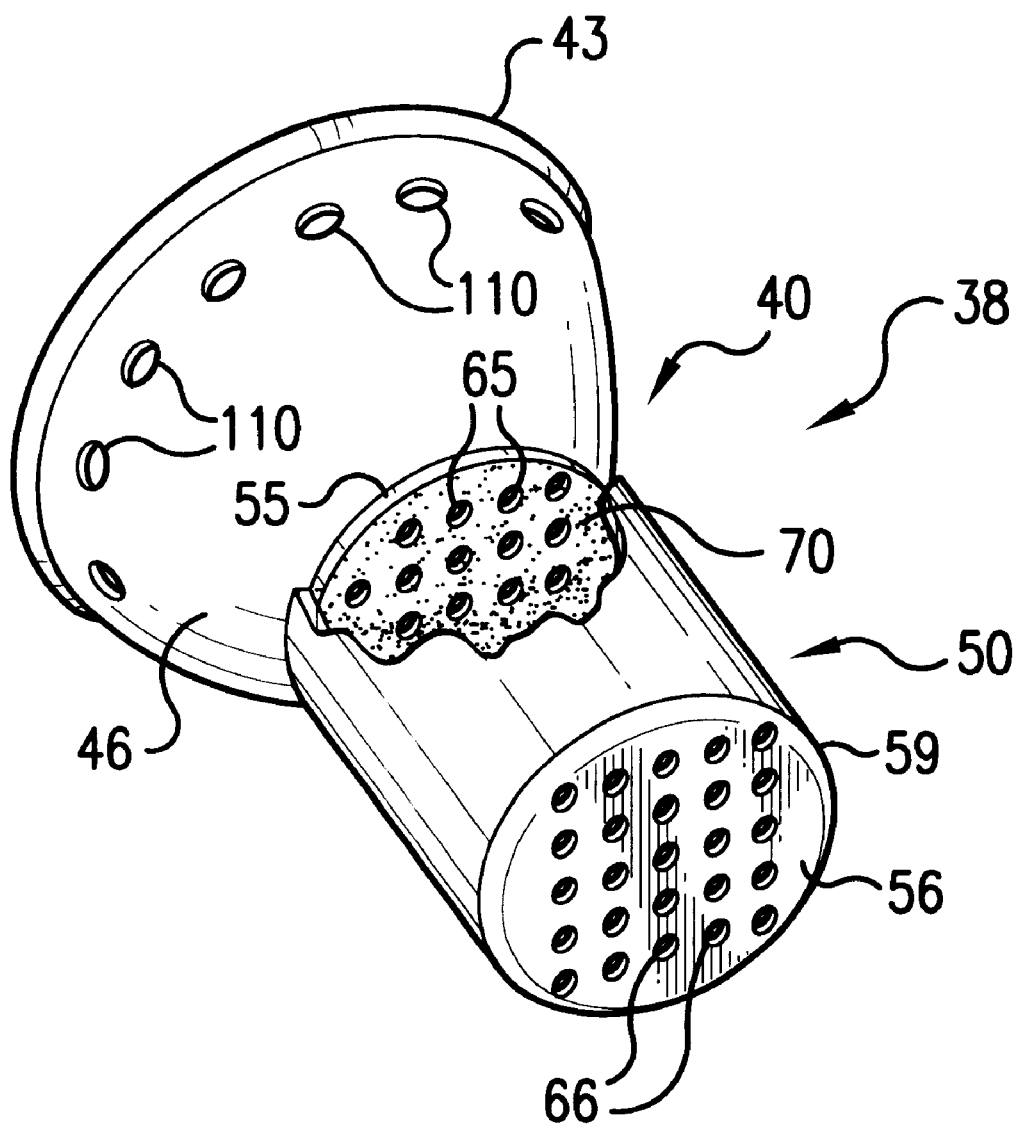
FIG. 18 is an isometric view of an alternative embodiment of the present invention.

Referring to FIG. 18, an alternative embodiment of filter basket 38 is shown which is identical to the embodiment previously described except vent holes or channels 110 are disposed in wall 46 (above the level of head 106 in receiver 40) to provide ventilation directly between receiver 40 and reservoir 93. In this case, the level of head surface 103 equalizes with the level of head surface 106, that is, at a level covering bottle-opening 84 and equal to the level of head surface 103a (shown in dashed lines in FIG. 17). For example, when five ounces of water are drawn from reservoir 93, a substantially equal volume of air being vented into reservoir 93, the air, or a portion thereof, may readily be received vented through channels 110 into receiver 40 and the water level 106 of receiver 40 and the water level 103 of reservoir 93 drops to an equal level below opening 84. Such air then bubbles into bottle 83 through opening 84 which together with air, if any, received directly via media 70 into opening 84 displaces an equal volume of water in bottle 83 into receiver 40, thus raising head surfaces 106 and 103 in receiver 40 and reservoir 93, respectively, to a level, once again, above the level of opening 84. This embodiment provides the advantage of ensuring that the full working volume of reservoir 93 is used, if there is hermetic seal formed at collar 90 and lip 43 with the top of reservoir as described previously or, if there is nearly a hermetic seal, thus prolonging filling the working volume of reservoir 93.

In either embodiment of the invention, filter media 70 remains, advantageously submerged in water and the water in filter 38 remains exposed to normal currents and mixing which occur in reservoir 93.

Filter 38 can be utilized advantageously not only in dispenser 80, but also in dispensers that use bottled water 99 to provide ice, chilled water, hot water and/or carbonated water, to improve pellucidity, taste and hygiene of water 99. When water 100 is chilled in reservoir 93, it has been observed that the cool temperatures of 34° F. to 39° F. assist filter media 70 by improving its adsorption capacity and reducing microbiological growth. Moreover, it eliminates salts associated with water hardness which tend to precipitate as a scum in hot beverages, such as coffee or tea and dissolved gases, such as oxygen, are responsible for negative consequences relative to the appearance and taste of hot beverages. By media 70 removing these deleterious substances from the water used to make the hot beverages, the resulting hot beverages are improved in taste and appearance. Further still, in removing dissolved gases, such as oxygen, and hardness from the water, the water becomes a better medium for carbonation, if desired. In any event, if water 99 was originally wanting in qualities of clarity, sanitation, softness, taste or healthfulness, after having passed through filter 38, these qualities will be improved in the water 100 which is received in reservoir 93 through filter media 70.

Filter 38 is normally and aesthetically hidden from view because it depends into reservoir 93 and is covered by bottle 83. But if the configuration of reservoir 93 prevents filter basket 38 from fully depending into it by, for example, heating or cooling coils or a carbonator in the space of reservoir 93, filter basket 36 may be supported in a raised disposition, by means obvious and well known in the art, such as a spacer, at the desired height. Nevertheless, bottom plate 56 must depend within reservoir 93 or be in watertight communication therewith.

Filter 38 is preferably constructed of plastic or other microwave-safe material. If lip 43 and/or plates 53 and 56 are constructed of non-microwave-safe material they then must be detachable from filter 38. Ring 96 need not be constructed of microwave-safe material inasmuch as it is not normally firmly secured to filter 38. The rest of filter 38 (and preferably all of filter 38), including filter media 70, is microwave-safe. Typically, the size of filter 38 is not larger than will easily fit in a conventional microwave oven. Accordingly, filter 38 can be easily disinfected in a household microwave oven. Filter 38 is adequately sterilized in a conventional household microwave oven in three minutes. Alternatively, filter 38 can be sterilized in boiling water. It has been observed that filter 38 normally should be sterilized every thirty to sixty days.

Filter 38 is easily removed from dispenser 80 since it is not rigidly attached to dispenser 80. It is removed by merely removing (preferably) empty bottle 83 and simply lifting out filter 38 from reservoir 93.

The operation of the invention as described with reference to FIG. 17 assumes that the space above head surface 106 is usually substantially hermetically sealed, whereas the space in reservoir 93, above head surface 103, is not hermetically sealed. However, whether or not the space above head surface 106 is vented, intentionally or unintentionally, the device operates substantially as described in reference to FIG. 18, irrespective of vents 110 in the FIG. 18 embodiment. Moreover, from the user's standpoint, it makes little difference whether or not the space above head surface 103 is vented This adaptability of the invention is a definite asset to the user who therefore need not normally be concerned about whether or not the fit of bottle 83 to olla 80 prevents or permits the passage of air.

It is preferable that air vented into bottle 83 in response to opening spigot 93 flow upwardly through filter media 70. Contaminated air is thus filtered before it is received in bottle 83. In the absence of filter 38, the water is gradually be tainted by the air bubbles received therethrough which may carry airborn pollen, microorganisms, dust, tobacco smoke and the like. Thus paradoxically, a dispenser fitted with filter 38 using municipal water may provide more wholesome water than bottled spring water from the same dispenser because the latter can be defiled by the unfiltered air that bubbles therethrough as the water is dispensed.

In order to test lead reduction by the potassium aluminosilicate media in accordance with the invention, lead in the form of lead oxide was introduced into a supply of municipal water with the object of averaging about 800 parts per billion (ppb) of lead in the influent. A filtration cartridge was prepared in accordance with the invention which contained 400 grams of potassium aluminosilicate in block form. Water having lead introduced into the effluent in amounts set forth was pumped through the filter at a rate of between one and five gallons per minute, and the amount of lead in ppb prior to the filter and in the effluent after the filter, again, in ppb, were measured. The results were set forth in Table 1 below:

TABLE 1

Lead Influent - 800 ppb

| Gallons | Measured Lead in Influent (ppb) | Effluent Lead Content (ppb) |
|---|---|---|
| 100 | 836 | Not greater than 5 |
| 200 | 717 | Not greater than 5 |
| 300 | 681 | Not greater than 5 |
| 400 | 934 | Not greater than 5 |
| 500 | 748 | Not greater than 5 |
| 600 | 731 | Not greater than 5 |

It will be appreciated that the lead removal was greater than 99% for all measurements.

In a further test, a filtration media was prepared in cartridge form which was composed of 1000 grams of potassium aluminosilicate in accordance with the invention blended with 2200 grams of activated carbon and extruded to provide a particle diameter of about 20 microns average, with the particles being in a range of 10 to 100 microns diameters. In addition a binder of polyolefin (manufactured by Quatum Chemical No. FM51000) was used in the blend. A 100% mix of potassium aluminosilicate can also be molded with a wax binder that is of a low molecular weight consisting of low density and high density grades. This wax, as modified, ranges to low acid and high acid value types as well as an acid modified type. This wax is described in Title 21 of the Code of Federal Regulations as "polyethelene wax". The binder required depends on the ratio of the potassium aluminosilicate to the blend. Any blend above 50% potassium aluminosilicate requires a multi-leg binder which has a low melting temperature and can blend 100% into the potassium aluminosilicate. The mixture was heated to 300° F. and pressed into its filtration configuration at about 60 psi. A water supply was provided wherein the influent would contain between 400 and 500 parts per million (ppm) of sodium chloride. Water was pumped from the supply water at a constant rate of 4.36 gallons per minute. Table II shows the results in tests of the amount of sodium chloride in the influent before the filtration media and then after the filtration media in the effluent. The tests were taken after a gallon flows through the filtration media as shown in the left hand column of Table II below:

TABLE II

SODIUM CHLORIDE REDUCTION
3200 GRAMS 100% MIXED BLENDED BLOCK OF POTASSIUM ALUMINOSILICATE
FLOW RATE = 4.36 GPM

| Gallons | Influent NaCl (ppm) | Effluent NaCl (ppm) |
|---|---|---|
| 10 | 400 | 0 |
| 50 | 400 | 0 |

TABLE II-continued

SODIUM CHLORIDE REDUCTION
3200 GRAMS 100% MIXED BLENDED BLOCK OF POTASSIUM ALUMINOSILICATE
FLOW RATE = 4.36 GPM

| Gallons | Influent NaCl (ppm) | Effluent NaCl (ppm) |
|---|---|---|
| 100 | 467 | 0 |
| 250 | 460 | 4 |
| 365 | 460 | 0 |
| 486 | 460 | 3 |
| 501 | 480 | 0 |
| 675 | 440 | 1 |
| 881 | 440 | 0 |
| 1067 | 440 | 0 |
| 1400 | 460 | 1 |
| 1621 | 448 | 0 |

It will be appreciated that the removal of sodium chloride from the influent was 100% in eight of the twelve measurements and in no case was less than 99%.

Table III sets forth a series of further tests to establish sulfate reduction. Here, the filtration media comprised 780 grams of potassium aluminosilicate in accordance with the invention admixed with 2000 grams of activated carbon and 300 grams of the polyolefin binder identified above. Metal sulfates were dissolved in the supply for the filtration media to provide sulfates at between 300 and 500 parts per million, and samples were taken for measurement of both the influents and the effluents at 100 gallon intervals. The flow rate through the filtration media was 3 gallons per minute. It will be seen in Table III that with influents having between 300 and 500 parts per million of sulfates, all measurable sulfates were removed wherein the test results for the effluents in each case were 0.

TABLE III

SULFATE REDUCTION
780 GRAMS PAS IN BLOCK FORM
MIXED WITH 2000 GRAMS OF CARBON
FLOW RATE = 3 GPM

| Gallons | Influent (ppm) | Effluent |
|---|---|---|
| 100 | 120 | 0 |
| 200 | 75 | 0 |
| 300 | 86 | 0 |
| 400 | 91 | 0 |
| 500 | 103 | 0 |

It will be appreciated from the foregoing that the mixture of 780 grams of potassium aluminosilicate in accordance with the invention with 2000 grams of activated carbon is effective to remove virtually all sulfates from the filtered water.

Table IV is a compilation of test results from field tests of the invention. Filters using 1000 grams potassium aluminosilicate media which were blended with varying amounts of activated carbon in a range of 150 to 850 grams. The flow rates of the water which passed through the filtration media were between 2 and 4 gallons per minute. The pH of the water varied from 7.4 to 8.6.

TABLE IV

| | Chloride | Alkalinity | Hardness | Sulfate | Hydrogen Sulfite | Dissolved Oxygen | Gallons |
|---|---|---|---|---|---|---|---|
| Influent | 70 | 97 | 120 | 65 | 0.1 | 11 | 100 |
| Effluent | 0 | 0 | 0 | 0 | 0 | 2 | |
| Influent | 86 | 110 | 112 | 36 | 0.36 | 13 | 1,000 |
| Effluent | 0 | 0 | 0 | 0 | 0 | 1 | |
| Influent | 61 | 136 | 146 | 37 | 0.39 | 11 | 2,000 |
| Effluent | 0 | 0 | 0 | 0 | 0 | 0 | |
| Influent | 89 | 100 | 130 | 31 | 0.33 | 7 | 3,000 |
| Effluent | 0 | 0 | 0 | 0 | 0 | 0 | |
| Influent | 96 | 97 | 112 | 61 | 0.41 | 9 | 4,000 |
| Effluent | 0 | 0 | 0 | 0 | 0 | 0 | |
| Influent | 76 | 96 | 117 | 71 | 0.61 | 6 | 5,000 |
| Effluent | 0 | 0 | 0 | 0 | 0 | 0 | |
| Influent | 51 | 71 | 101 | 46 | 0.46 | 8 | 10,000 |
| Effluent | 0 | 0 | 0 | 0 | 0 | 0 | |

As can be seen from the foregoing compilation of field tests, after 26,000 gallons, the filter continues to perform at virtually 100% efficiency. This projects a life expentancy of the filtration media in accordance with the invention beyond known existing technology for reducing chlorides, alkalinity, sulfates, hydrogen sulfite and dissolved oxygen. When water flow rates were increased and the pH is above 8, the performance of the filtration media seems to improve—primarily alkalinity reduction. It is believed that this improvement results from increased turbulence around and within the potassium aluminosilicate particles of the filtration media.

Although this invention has been disclosed and discussed primarily in terms of specific embodiments thereof, it should be understood that this description has been given for clearness of understanding only, and no unnecessary limitations should be understood therefrom, and that modifications which will be obvious to those skilled in the art upon becoming familiar with the invention are within the spirit and scope of the appended claims.

Having thus disclosed my invention, what I claim as new and desire to secure by Letters Patent of the United States is:

1. An adsorbent material comprising a synthetic potassium aluminosilicate composed at least in part of porous non-crystalline material that was subjected to ultraviolet radiation during its formation of its said porous non-crystalline structure to produce pores in said material which have diameters between about 60 Angstroms and about 250 Angstroms.

2. An adsorbent material in accordance with claim 1, wherein said porous non-crystalline structure was formed at temperatures in the range of 20° C. to 39° C., and the relative humidity to which said potassium aluminosilicate was exposed during formation of the porous non-crystalline structure was less than about 20%.

3. An adsorbent material in accordance with claim 1, wherein the product of said formation of the porous non-crystalline structure is initially a synthetic, zeolitic, sodium aluminosilicate gel wherein subsequentially there has been a substantially complete substitution of sodium for potassium.

4. An adsorbent material in accordance with claim 1, which is subjected to said ultraviolet radiation from the sun during said formation of the porous non-crystalline structure.

5. An adsorbent material in accordance with claim 1, which is formed while subjected to intense ultraviolet radiation, in the range of about 2000 Angstroms to about 3900 Angstroms, from ultraviolet lamps.

6. An adsorbent material in accordance with claim 1, wherein said formation of the porous non-crystalline structure of said material within said potassium aluminosilicate is completed in at least about one week.

7. A process for the filtration of potable water which comprises flowing said water through a filter composed of synthetic potassium aluminosilicate media which removes oxygen from said water, wherein said potassium aluminosilicate media was subjected to ultraviolet radiation during its formation resulting in a non-crystalline structure and having pores, the diameters of said pores being at least about 60 Angstrom units.

8. A process in accordance with claim 7, wherein said potassium aluminosilicate media is confined within a container of at least forty cubic inches capacity.

9. A process in accordance with claim 7, wherein the surface area of said potassium aluminosilicate media to which said water is exposed as it flows through said filter is at least about 175 square meters per gram of said potassium aluminosilicate.

10. A process in accordance with claim 7, wherein said potassium aluminosilicate media is composed in part of spongy, porous non-crystalline structure.

11. A process in accordance with claim 7, wherein said potassium aluminosilicate media is composed of about 10% to 17% by weight potassium.

12. A process in accordance with claim 7 comprising the further step of freezing said filtered water to form ice with improved taste and clarity.

13. A process in accordance with claim 7 comprising the further step of cooling said filtered water to provide cold water with improved taste and appearance.

14. A process in accordance with claim 7, comprising the further step of heating said filtered water and mixing said heated water with a beverage substance to provide a hot and cold beverages having an improved taste and appearance.

15. A process in accordance with claim 14, wherein said beverage substance is a substance selected from the group consisting of coffee, tea and cocoa.

16. A process in accordance with claim 7, wherein said potassium aluminosilicate media removes one or more substances selected from the group consisting of lead, calcium, calcium bicarbonate, ammonia, sodium sulfite and hydrogen sulfide from said water.

17. A process in accordance with claim 7, wherein said potassium aluminosilicate media comprises a second stage filter of said potable water, said water flowing first through a first stage filter comprising an anion media.

18. A process in accordance with claim 17, wherein said first stage filter comprises a strong base anion media charged with a carbonate and/or a bicarbonate.

19. An apparatus for the filtration of water which comprises a dispensing unit for dispensing said water, a filtration unit for filtering the water received by said dispensing unit, said filtration unit comprising a container which comprises a synthetic, non-crystalline potassium aluminosilicate filtration media which was subjected to ultraviolet radiation during its formation resulting in said non-crystalline structure, said synthetic potassium aluminosilicate filtration media having pores, the diameters of said pores being at least 60 Angstroms.

20. An apparatus in accordance with claim 19, wherein said pores have diameters which are in the range of about 60 Angstroms to 250 Angstroms.

21. An apparatus in accordance with claim 19, wherein the surface area of said potassium aluminosilicate filtration media is in a range of about 175 to 450 square meters per gram of said media.

22. An apparatus in accordance with claim 19 wherein said potassium aluminosilicate filtration media comprises at least about 17% by weight potassium.

23. An apparatus in accordance with claim 19, further comprising refrigeration means for freezing said water to form ice.

24. An apparatus in accordance with claim 19, further comprising refrigeration means for cooling said water to provide cold water.

25. An apparatus in accordance with claim 19, comprising heating means for heating said water.

26. An apparatus in accordance with claim 19, wherein the amount of said potassium aluminosilicate in said container is at least forty cubic inches.

27. An apparatus in accordance with claim 19, wherein said potassium aluminosilicate media comprises a second stage of said filtration unit, the apparatus comprising a first stage filter which includes an anion media.

28. An apparatus in accordance with claim 27, wherein said first stage filter comprises a strong base anion media charged with a carbonate and/or a bicarbonate.

29. A process for dispensing potable water which comprises the steps of filtering said water with a synthetic potassium aluminosilicate filter material which is non-crystalline having pores formed by subjecting said material to ultraviolet radiation during its formation and composed of about 10–21% $Al_2O_3 \cdot 3H_2O$ and 68–72% $K_2O \cdot 2.88$–$3.22SiO_2 + 2$–$4H_2O$, and 7–11% KOH, by weight, the pores of said potassium aluminosilicate material having diameters of at least about 60 Angstrom units, and said potassium aluminosilicate material adsorbing dissolved oxygen and removing impurities from said water before said water is dispensed.

30. A process in accordance with claim 29, comprising the further step of largely displacing the sodium initially in said potassium aluminosilicate material with potassium.

31. A process in accordance with claim 29, wherein a further impurity is dissolved in said water which comprises at least one of the following: lead, hydrogen, calcium, calcium carbonate, calcium bicarbonate, hydrogen sulfide, ammonia and sodium sulfite, said filter removing said further impurity from said water.

32. A process in accordance with claim 29, comprising the further step of freezing said filtered water into ice with improved clarity and taste.

33. A process in accordance with claim 29, comprising the further step of cooling said filtered water to provide cold water of improved taste and appearance.

34. A process in accordance with claim 29, comprising the further steps of heating said filtered water and mixing a beverage substance with said heated water to provide a hot beverage with an improved taste.

35. A process in accordance with claim 34, wherein said beverage substance is a substance selected from the group consisting of coffee, tea and cocoa.

36. A process in accordance with claim 29, which comprises the further step of filtering said water with an anion exchange media prior to filtering said water with said potassium aluminosilicate filter material.

37. A process in accordance with claim 36, wherein said anion exchange media comprises a first stage filter of strong base anion charged with a carbonate and/or a bicarbonate.

38. A process for filtration of water to improve its carbonation either in the form of potable carbonated water, or as a carbonated beverage formed by mixing said carbonated water with a beverage syrup, which comprises the filtration of the water before it is carbonated by filtering said water through synthetic, non-crystalline potassium aluminosilicate media having pores of at least about 60 Angstrom formed by exposing said media to ultraviolet radiation during its formation, said media removing potassium substantially all dissolved lead, oxygen, calcium, calcium bicarbonate, ammonia, sodium sulfite, hydrogen and hydrogen sulfide that is in said water therefrom prior to carbonation.

39. A process in accordance with claim 38, wherein said potassium aluminosilicate media is confined in a container of at least forty cubic inch capacity.

40. A process in accordance with claim 39, wherein said container comprises a tank of at least one hundred cubic feet capacity.

41. A process in accordance with claim 38, wherein the surface area of said potassium aluminosilicate media is at least approximately 175 square meters per gram.

42. A process in accordance with claim 38, wherein said water after being carbonated is conveyed to a dispenser, said dispenser having a mechanism for adding beverage syrup to said carbonated water.

43. A process in accordance with claim 42, wherein carbon dioxide is mixed with said water, which has been filtered through said potassium aluminosilicate media, in a carbonator under a pressure of about two to five atmospheres.

44. A process in accordance with claim 38, wherein a beverage syrup is mixed with said carbonated water while it is in said carbonator under a pressure of about two to five atmospheres.

45. A process in accordance with claim 38, wherein said potassium aluminosilicate media comprises 10% to 17% by weight potassium.

46. A process in accordance with claim 38, wherein said potassium aluminosilicate media comprises a second stage filter.

47. A process in accordance with claim 46, wherein said second stage filter comprises an anion exchange media having a strong base anion that has been activated with a carbonate and/or a bicarbonate and which removes sulfides, sulfates and sulfites from said water.

48. An apparatus for the filtration of water to improve its carbonation either in the form of potable carbonated water or as a carbonated beverage formed by mixing said carbonated water with a beverage syrup, which comprises a carbonation unit for dissolving carbon dioxide in water under a pressure in the range of about two to five atmospheres, a dispenser for selectively receiving carbonated water from said carbonation unit and dispensing said carbonated water at atmospheric pressure, said carbon dioxide dissolved in said water in said carbonator causing an effervescence in a carbonated beverage dispensed from said dispenser, a filtration unit for filtering the water received by said carbonation unit, said filtration unit comprising a container which contains synthetic, non-crystalline potassium aluminosilicate filtration media having pores and formed by exposing said media to ultraviolet radiation during its formation, sodium originally in said potassium aluminosilicate media having been largely displaced by potassium and said potassium aluminosilicate media's pores having a diameter of at least about 60 Angstroms for adsorbing dissolved impurities from said water supply before it is introduced into said carbonation unit.

49. An apparatus in accordance with claim 48, wherein said potassium aluminosilicate filtration media has pore diameters in the range of about 60 Angstroms to 250 Angstroms and pore volume of about 0.7 cc per gram.

50. An apparatus in accordance with claim 48, wherein said surface area of said potassium aluminosilicate filtration media is in a range of about 175 to 450 square meters per gram.

51. An apparatus in accordance with claim 48, which is in a building, said filtration unit being installed in the plumbing of said building, said filtration unit containing between about forty cubic inches and two cubic feet of said potassium aluminosilicate media.

52. An apparatus in accordance with claim 48, wherein said apparatus is in a beverage plant, and said filtration unit being installed in the plumbing of said beverage plant, said filtration unit comprising a tank having a capacity between about twenty-five and five hundred cubic feet.

53. An apparatus in accordance with claim 48, wherein said impurities removed from said water by said potassium aluminosilicate media comprise oxygen and one or more substances selected from the group consisting of lead, calcium, calcium bicarbonate, ammonia, sodium sulfite, hydrogen and hydrogen sulfide.

54. An apparatus in accordance with claim 48, wherein the amount of said potassium aluminosilicate media in said container is at least forty cubic inches.

55. An apparatus in accordance with claim 48, wherein said potassium aluminosilicate media comprises a second stage filter, a first stage filter being provided to filter said water before it flows in said second stage filter, said first stage filter comprising strong base anion activated with a carbonate and/or a bicarbonate provided in said container.

56. In the process of carbonating water, the improvement comprising: filtering the water with a synthetic, non-crystalline potassium aluminosilicate filter material having pores of at least about 60 Angstrom prior to carbonating the water, said pores having been formed by exposing said media to ultraviolet radiation during formation.

57. A process in accordance with claim 56, wherein sodium which was initially contained in said potassium aluminosilicate filter material was largely displaced by potassium, said potassium aluminosilicate filter material adsorbing dissolved oxygen in said water and removing impurities from said water before it is carbonated.

58. A process in accordance with claim 57, wherein said impurities comprise one or more substances selected from a group consisting of lead, hydrogen, calcium, calcium carbonate, calcium bicarbonate, hydrogen sulfide, ammonia and sodium sulfite.

59. A process in accordance with claim 58, comprising a further step of before filtering said water with said aluminosilicate filter material filtering said water with a strong base anion that has been activated with a potassium salt.

60. A method of filtering water in an inverted bottle type water dispenser comprising, funneling water from an inverted bottle of an inverted bottle type dispenser to a gravity filter compartment containing a filtration media which is composed, at least in part, of a synthetic, non-crystalline potassium aluminosilicate media having pores of at least about 60 Angstrom formed by exposing said media to ultraviolet radiation during its formation, passing said water through said filtration media so that one or more substances selected from the group consisting of oxygen, lead, zinc, copper, calcium, calcium bicarbonate, ammonia, sodium sulfite and hydrogen sulfide is substantially removed from said water, discharging said water from said filter compartment directly to a water reservoir of said water dispenser.

61. A method as claimed in claim 60 further comprising: venting air to said inverted bottle through said filtration media.

62. A method as claimed in claim 60 further comprising: substantially sterilizing said filter compartment and said filtration media by using microwave radiation from a microwave oven.

63. A method as claimed in claim 60, wherein said filter compartment and filtration media are substantially completely sterilized after being exposed to said microwave radiation for a period of approximately three minutes.

64. A method as claimed in claim 60, wherein one or more substances selected from a group consisting of activated carbon, organic ion exchange media, aluminum oxide, metal oxide resins, zirconium oxide, a weak cation exchange media, and strong base anion resin is further utilized in said filtration media.

65. A method as claimed in claim 60, wherein three mesh granular activated carbon is further utilized in said filtration media.

66. A method as claimed in claim 60, wherein chlorine and chloramines are also removed from said water by said filtration media.

67. A process of removing lead from water which comprises flowing water through a filtration media comprising:
a synthetic aluminosilicate gel,
said synthetic aluminosilicate gel having been exposed to ultraviolet radiation for at least a sufficient period to commence formation of a porous non-crystalline structure,
said porous non-crystalline structure in said aluminosilicate gel comprising pore diameters which are at least 60 Angstroms.

68. A synthetic aluminosilicate gel as claimed in claim 67 composed of $0.9\pm0.2\ Na_2O;\ Al_2O_3{:}3{-}6\ SiO_2{:}5{-}9H_2O$.

69. A synthetic aluminosilicate gel as claimed in claim 68, wherein potassium has been added to said aluminosilicate gel to displace said sodium therein.

70. A synthetic aluminosilicate gel as claimed in claim 67, wherein said ultraviolet radiation comprises a wavelength which is within a range from about 2000 Angstroms to about 3900 Angstroms.

71. A synthetic aluminosilicate gel as claimed in claim 67, wherein said ultraviolet radiation comprises sunlight.

72. A synthetic aluminosilicate gel as claimed in claim 67, wherein an ultraviolet lamp produces said ultraviolet radiation.

73. A synthetic aluminosilicate gel as claimed in claim 67, wherein said porous non-crystalline structure comprises pores having diameters of up to 250 Angstroms.

74. A synthetic aluminosilicate gel as claimed in claim 67, wherein the temperature in which said porous non-crystalline structure forms upon being exposed to said ultraviolet radiation is maintained within a range of 25° C. to 39° C.

75. A synthetic aluminosilicate gel as claimed in claim 67, wherein during the process of making it the surrounding relative humidity is maintained at about 20% or less.

76. A synthetic aluminosilicate gel as claimed in claim 67, wherein said formation of the porous non-crystalline structure of said media within said aluminosilicate gel is substantially completed in at least about one week.

77. A filtration media as claimed in claim 67 further composed of:
   one or more substances selected from a group consisting of activated carbon, organic ion exchange media, aluminum oxide, zirconium oxide, metal oxide resins, and strong base anion resin.

78. A filtration media as claimed in claim 67 further composed of three mesh granular activated carbon.

79. A filtration media as claimed in claim 67, wherein the process also removes one or more substances selected from the group consisting of oxygen, chlorine, lead, zinc, copper, calcium, calcium bicarbonate, ammonia, sodium sulfite and hydrogen sulfide from said water.

80. For use in the process of the filtration of drinking water, a filtration media comprising:
   a synthetic, non-crystalline potassium aluminosilicate gel in a molded form which is blended with activated carbon and comprised of fine particles, said particles having diameters of approximately five to one hundred microns;
   wherein the ratio by weight of said potassium aluminosilicate gel to said activated carbon in said particles is between about five and twenty-five per cent to between about seventy-five and ninety-five per cent.

81. A filtration media as claimed in claim 80, wherein the diameters of said particles are in a range of about ten to fifty microns.

82. A filtration media as claimed in claim 80, wherein said potassium aluminosilicate gel particles contain pores having diameters between sixty and two hundred and fifty Angstroms.

83. A filtration media as claimed in claim 80, wherein said particles are approximately twenty to forty microns in diameter.

84. A filtration media as claimed in claim 80, wherein the ratio of volume of said potassium aluminosilicate gel particles to said activated carbon particles is between about ten and fifteen per cent to between eighty and ninety-five percent.

85. A process of filtering drinking water by flowing it through a filtration media comprising:
   a synthetic, non-crystalline potassium aluminosilicate gel in extruded form comprised of fine particles, said particles being approximately 1–100 microns in diameter, mixed with activated carbon and a binder, wherein the ratios by weight of said potassium aluminosilicate gel particles, said activated carbon particles and said binder is 45%–90%: 8%–45%: 2%–8%.

86. A filtration media as claimed in claim 85, wherein said potassium aluminosilicate gel particles contain pores having diameters between 60 and 250 Angstroms.

87. A filtration media as claimed in claim 85, wherein the majority of said particles are 20 microns or less in diameter.

* * * * *